US012715538B2

(12) United States Patent
McCormick et al.

(10) Patent No.: US 12,715,538 B2
(45) Date of Patent: Aug. 25, 2026

(54) FORK CROWN ARM STRUCTURE

(71) Applicant: Fox Factory, Inc., Duluth, GA (US)

(72) Inventors: Daniel McCormick, Santa Cruz, CA (US); Bryan Wesley Anderson, Santa Cruz, CA (US); Joshua Coaplen, Asheville, NC (US)

(73) Assignee: Fox Factory, Inc., Duluth, GA (US)

( * ) Notice: Subject to any disclaimer, the term of this patent is extended or adjusted under 35 U.S.C. 154(b) by 539 days.

(21) Appl. No.: 18/107,946

(22) Filed: Feb. 9, 2023

(65) Prior Publication Data

US 2023/0271667 A1 Aug. 31, 2023

Related U.S. Application Data

(60) Provisional application No. 63/308,859, filed on Feb. 10, 2022.

(51) Int. Cl.
*B62K 21/04* (2006.01)

(52) U.S. Cl.
CPC .................................... *B62K 21/04* (2013.01)

(58) Field of Classification Search
CPC ...................................................... B62K 21/04
See application file for complete search history.

(56) References Cited

U.S. PATENT DOCUMENTS 634,043 A * 10/1899 Venour .................. B62K 21/04 280/280
6,095,542 A * 8/2000 Allen ..................... B62K 21/04 280/279
9,027,947 B2 * 5/2015 Galasso ................... B62K 3/02 280/279
9,975,595 B2 5/2018 Galasso et al.
10,850,793 B2 12/2020 Galasso
11,718,362 B2 * 8/2023 Coaplen ................. B60G 11/27 280/276
2015/0291246 A1 10/2015 Achenbach et al.
2019/0107162 A1 4/2019 Pavesio et al.
2021/0237824 A1 8/2021 Coaplen et al.
2022/0318444 A1 10/2022 Coaplen et al.

FOREIGN PATENT DOCUMENTS

EP 2108576 A1 10/2009
EP 2108576 B1 11/2010
EP 3385152 A1 10/2018
EP 3385152 B1 7/2020

OTHER PUBLICATIONS

European Search Report for European Application No. 23156195.2, 7 pages, Jul. 3, 2023.
European Examination Report for European Application No. 23156195.2, 7 pages, Nov. 26, 2025.

* cited by examiner

*Primary Examiner* — Minnah L Seoh
*Assistant Examiner* — Hosam Shabara

(57) ABSTRACT

Disclosed herein is a crown comprising a steerer tube boss, a first upper tube boss, and a second upper tube boss. The first upper tube boss and the second upper tube boss reside on a plane on opposing sides of the upper tube boss, wherein the plane comprises the central axis of the first upper tube boss and the central axis of the second upper tube boss. There is a first arm to connect the first upper tube boss to the steerer tube boss, as well as a second arm to connect the second upper tube boss to the steerer tube boss. At least one of the first arm or the second arm comprises at least one bore that extends in a direction that is substantially normal to the plane.

19 Claims, 29 Drawing Sheets

FORK CROWN ARM STRUCTURE

CROSS-REFERENCE TO RELATED APPLICATIONS (PROVISIONAL)

This application claims priority to and benefit of co-pending U.S. Provisional Patent Application No. 63/308,859 filed on Feb. 10, 2022, entitled "FORK CROWN ARM STRUCTURE" by McCormick et al., and assigned to the assignee of the present application, the disclosure of which is hereby incorporated by reference in its entirety.

FIELD OF THE INVENTION

Embodiments of the invention generally relate to the field of vehicle frames, support members, and the like.

BACKGROUND ART

Vehicle components, frames, members, suspension systems, and the like, must resist forces tending to twist and/or bend those structures. Further, it is desirable that such structures be maintained in position relative to one another. That often means that the structures and/or their connection to one another need to be suitably reinforced. As such, these structures are manufactured to meet a number of structural integrity requirements. These requirements can include the ability to support a structural load (e.g., a weight, force, etc.) without breaking or failing.

BRIEF DESCRIPTION OF THE DRAWINGS

The accompanying drawings, which are incorporated in and form a part of this specification, illustrate embodiments of the present technology and, together with the description, serve to explain the principles of the present technology.

Figure 1:
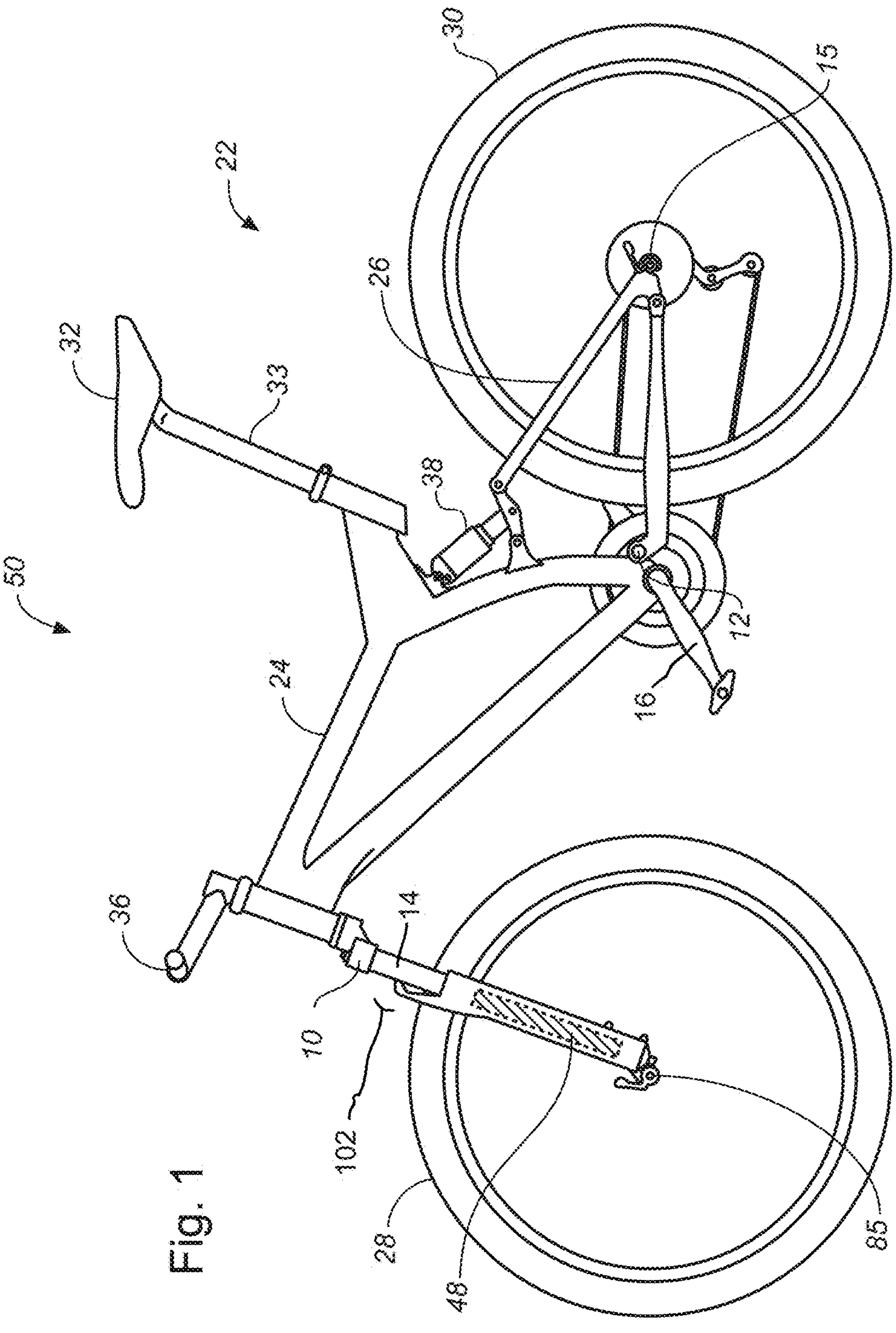
FIG. 1 is a perspective view of a bicycle, in accordance with an embodiment.

The drawings referred to in this description should be understood as not being drawn to scale except if specifically noted.

DETAILED DESCRIPTION OF THE EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

In the following discussion, and for purposes of clarity, a bicycle is utilized as the example vehicle. However, in another embodiment, the vehicle could be one any one of a variety of vehicles such as, but not limited to, a bicycle, a motorized bicycle, a motorcycle, a watercraft (e.g., boat, jet ski, PWC, etc.), a snow machine, a single wheeled vehicle, a multi-wheeled vehicle, a side-by-side, an on-road and/or off-road vehicle, an aircraft, a personal light electric vehicle (PLEV), or the like. In general, a motorized bike can include a bike with a combustion motor, an electric bike (e-bike), a hybrid electric and combustion bike, a hybrid motor and pedal powered bike, and the like.

Often, bicycle components are designed with a large performance window to cover a broad scope of consumers and ride types. For example, a mountain bike sold at a shop may be designed with components manufactured to meet the needs of intermediate level riders with a body weight between 120-180 lbs. (for example). As such, a bike shop would be able to use the weight criteria to help guide the customer in the purchase of an appropriate bike with an appropriate level of component performance.

However, as the rider advances in skill, the performance requirements of one or more components of the bike will likely need to be upgraded. These upgrades can include aspects such as stronger structures, lighter structures, etc. Moreover, depending upon the type of bike and the type of terrain, features, jumps, bumps, performance expectations, and the like, there may be a need to only upgrade one or some components. In some extreme performance cases, there may be a desire to find even a very small weight and/or strength advantage that would allow the rider to be just a bit faster, jump a bit higher, gain just a bit of top end speed, etc. than a fellow competitor.

In one embodiment, the term topological optimization is used. In general, topological optimization can include optimization methods for material usage that can be additive, subtractive, or both additive and subtractive. It should be appreciated that although topological optimization is used herein, in one embodiment, the process could be referred to as a generative design, or other terminology to indicate methods for material usage that are additive and/or subtractive.

In one embodiment, additive refers to the process of adding (or growing) material to make a part. An example of an additive process is a 3D printer. In one embodiment, subtractive refers to the process of removing material from an existing chunk of material to make a part. An example of a subtractive process is a milling machine milling a block of material down to form a part.

In one embodiment, the topological optimized or generative designed part can include lattice structures.

Referring now to FIG. 1, a schematic side view of a bicycle 50 having a topologically optimized component design incorporated therewith is shown in accordance with an embodiment. For the purpose of illustration, the discussed embodiments include components such as the crown, arch, and crank shaft, however it should be understood that the purpose is not to limit the embodiments to those parts. The discussed embodiments are for the sake of brevity and clarity, and embodiments could easily include other components of a bicycle.

In one embodiment, bicycle 50 has a main frame 24 with a suspension system comprising a swing arm 26 that, in use, is able to move relative to the rest of main frame 24; this movement is permitted by, inter alia, damper 38. The front fork assembly 102 also provide a suspension function via a damper 48 in at least one fork leg; as such the bicycle 50 is a full suspension bicycle (such as an ATB or mountain bike).

However, the embodiments described herein are not limited to use on full suspension bicycles. In particular, the term "suspension system" is intended to include vehicles having front suspension only, rear suspension only, seat suspension only, a combination of two or more different suspension types, and the like.

In one embodiment, swing arm 26 is pivotally attached to the frame 24 at pivot point 12. Although pivot point 12 is shown in a specific location, it should be appreciated that pivot point 12 can be found at a different location. In a hard tail bicycle embodiment, there would be no pivot point 12. In one embodiment of a hardtail bicycle, main frame 24 and swing arm 26 would be formed as a fixed frame.

Bicycle 50 includes a front wheel 28 which is coupled with the front fork assembly 102 via axle 85. In one embodiment, a portion of front fork assembly 102 (e.g., a steerer tube) passes through the bicycle main frame 24 and couples with handlebars 36 and crown 10. In so doing, the front fork assembly and handlebars are rotationally coupled with the main frame 24 thereby allowing the rider to steer the bicycle 50. Crown 10 couples to the upper tubes 14 of the front fork assembly 102.

Bicycle 50 includes a rear wheel 30 which is coupled to the swing arm 26 at rear axle 15, and a rear damping assembly (e.g., damper 38) is positioned between the swing arm 26 and the frame 24 to provide resistance to the pivoting motion of the swing arm 26 about pivot point 12. Crank arm 16 allows the transfer of energy from the pedals of the bike to the rear wheel 30 via the chains. In one embodiment, a saddle 32 is connected to the main frame 24 via a seatpost 33. In one embodiment, seatpost 33 is a dropper seatpost. In one embodiment, one or more of fork damper 48, damper 38, seatpost 33, handlebars 36, and/or the like include one or more active damping components.

Figure 2:
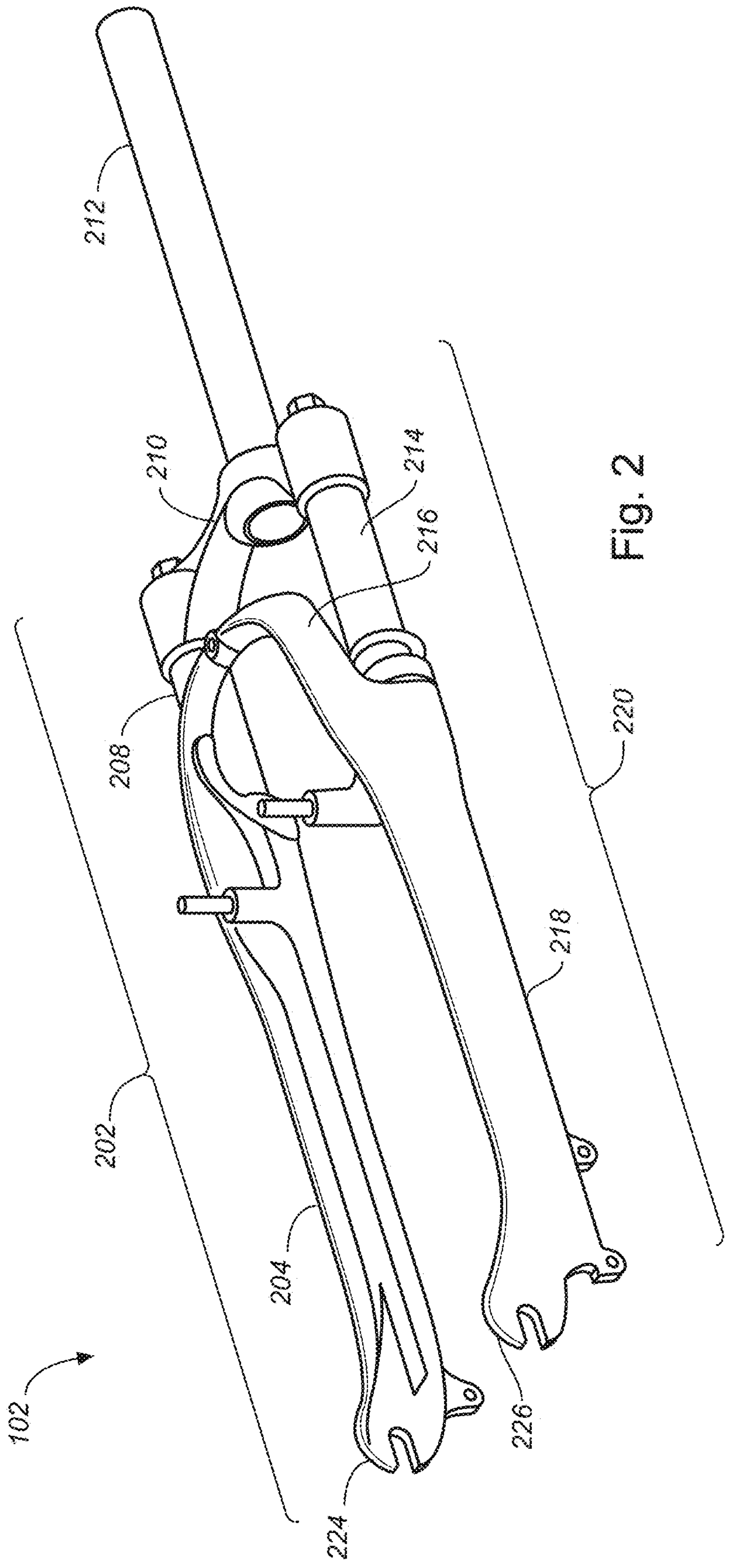
FIG. 2 is a perspective view of a front fork assembly having a topologically optimized component design incorporated therewith, in accordance with one embodiment.

Referring now to FIG. 2, a perspective view of the front fork assembly 102, as being detached from the bicycle 50 of FIG. 1, is shown in accordance with an embodiment. The front fork assembly 102 include right and left legs, 202 and 220, respectively, as referenced by a person in a riding position on the bicycle 50. The right leg 202 includes a right upper tube 208 telescopingly received in a right lower tube 204. Similarly, the left leg 220 includes a left upper tube 214 telescopingly received in a left lower tube 218.

In one embodiment, the telescoping of the legs is inverted. That is, the right lower tube 204 of right leg 202 is telescopingly received in the right upper tube 208. Similarly, the left lower tube 218 of left leg 220 is telescopingly received in the left upper tube 214.

A crown 210 connects the right upper tube 208 to the left upper tube 214 thereby connecting the right leg 202 to the left leg 220 of the front fork assembly 102. In addition, the crown 210 supports a steerer tube 212, which passes through, and is rotatably supported by, the frame 24 of the bicycle 50. The steerer tube 212 provides a means for connection of the handlebar assembly 36 to the front fork assembly 102.

Each of the right lower tube 204 and the left lower tube 218 includes dropouts 224 and 226, respectively, for connecting the front wheel 104 to the front fork 102 via a front axle 85. An arch 216 connects the right lower tube 204 and the left lower tube 218 to provide strength and minimize twisting thereof.

Figure 3:
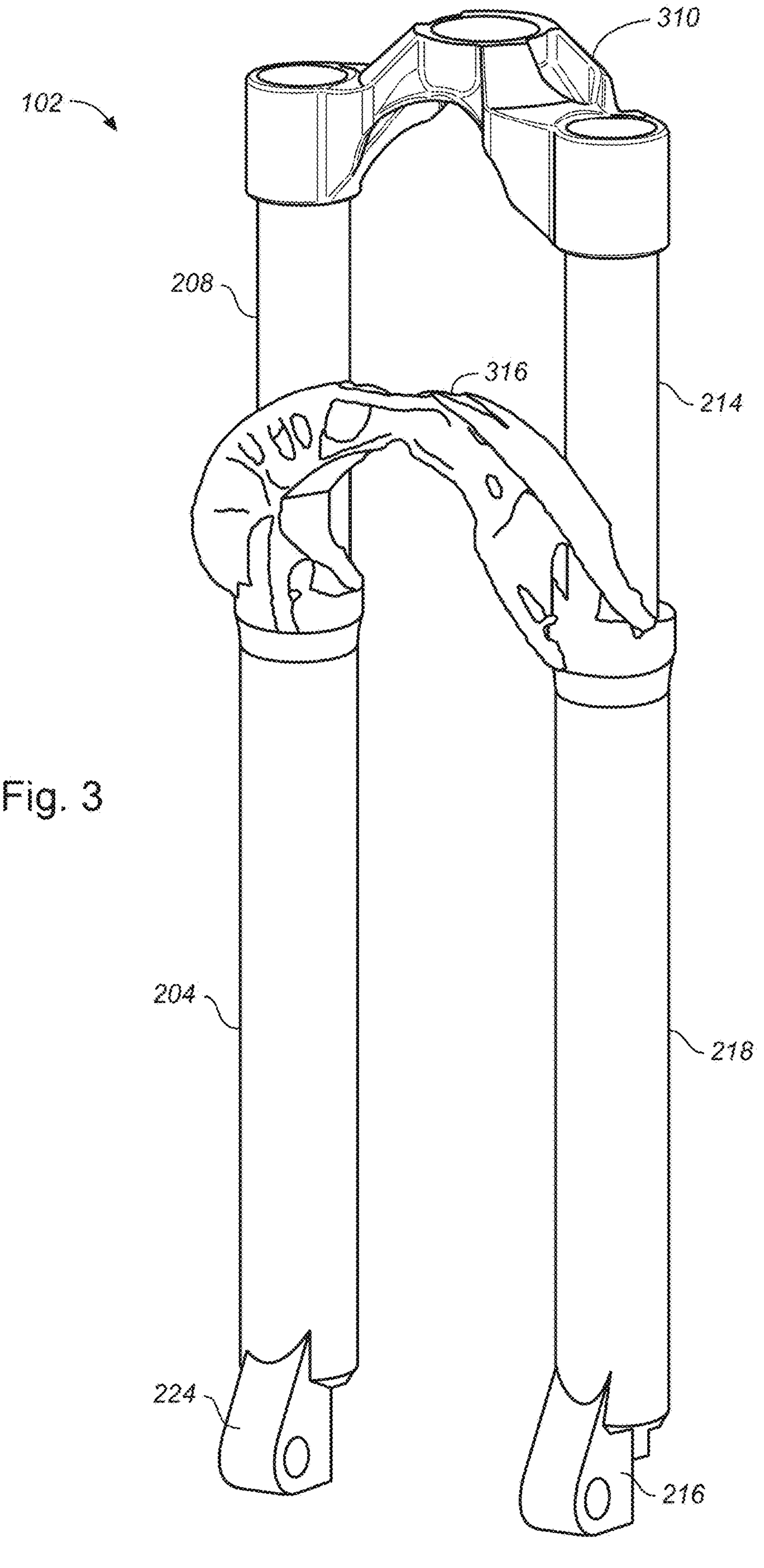
FIG. 3 is a perspective view of the relevant portions of the front fork assembly of FIG. 2 showing a number of topologically optimized design components incorporated therewith, in accordance with one embodiment.

With reference now to FIG. 3, a perspective view of the relevant portions of the front fork assembly 102 showing a number of topologically optimized design components incorporated therewith is shown in accordance with one embodiment. In one embodiment, front fork assembly 102 includes a topologically optimized fork arch 316. In one embodiment, front fork assembly 102 includes a topologically optimized fork crown 310. In one embodiment, front fork assembly 102 includes a topologically optimized fork arch 316 and a topologically optimized fork crown 310.

Figure 4A:
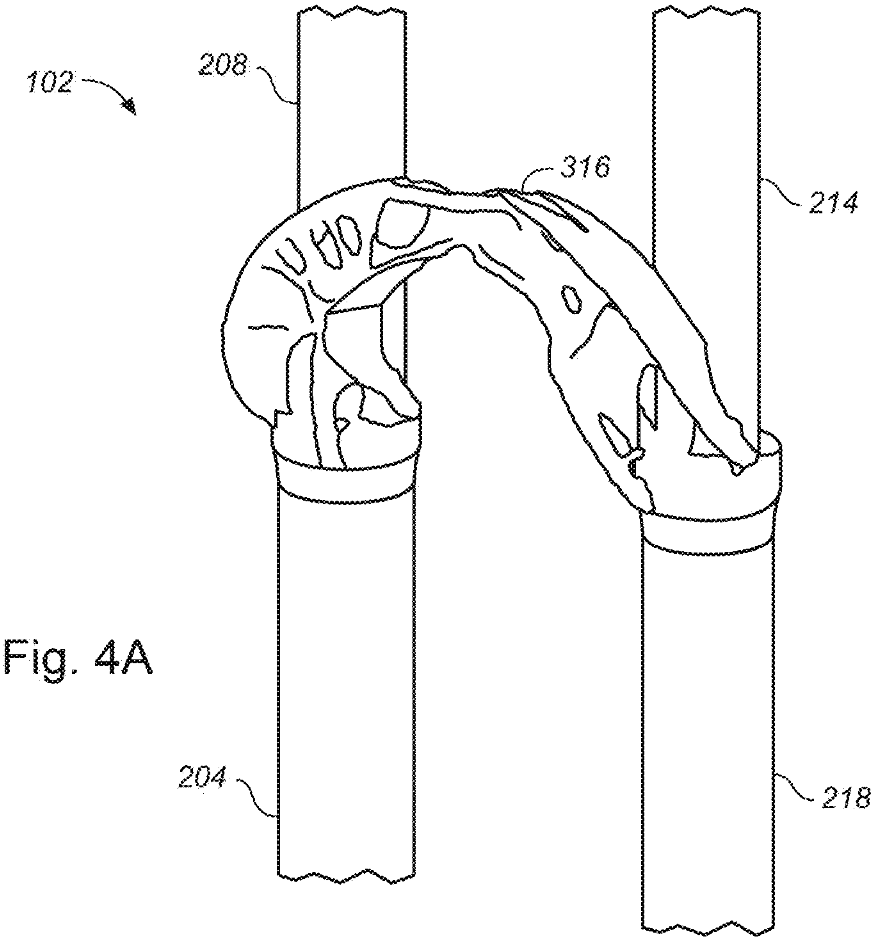
FIG. 4A is a perspective view of the relevant portions of the front fork assembly having a topologically optimized fork arch design, in accordance with one embodiment.

Referring now to FIG. 4A, a perspective view of the relevant portions of the front fork assembly 102 having a topologically optimized fork arch 316 is shown in accordance with one embodiment. In one embodiment, the topologically optimized fork arch 316 is coupled with right lower tube 204 and left lower tube 218. In an inverted fork embodiment, the topologically optimized fork arch 316 would be coupled with right upper tube 208 and left upper tube 214.

In the following discussion, for purposes of clarity, the topologically optimized fork arch 316 will be coupled to a fork assembly 102 in a standard telescoping configuration. However, it should be appreciated that the topologically optimized fork arch 316 could be coupled to a front fork assembly 102 having an inverted orientation in the same or similar configuration. In one embodiment, the topologically optimized fork arch 316 could be coupled to a front fork assembly 102 in front of the steering axis (as seen by a rider). In one embodiment, the topologically optimized fork arch 316 could be coupled to a front fork assembly 102 behind the steering axis (as seen by a rider).

In one embodiment, topologically optimized fork arch 316 is used for coupling the fork legs together at a second location offset from the crown. In one embodiment, topologically optimized fork arch 316 provides improved alignment of the left and right fork legs of a bicycle by allowing for mid-assembly horizontal, vertical and rotational adjustment of the fork legs via the topologically optimized fork arch 316.

In one embodiment, the topologically optimized fork arch 316, the right lower tube 204 and left lower tube 218 are manufactured as a single piece.

In one embodiment, the topologically optimized fork arch 316 is formed separately from the fork legs, and/or of a different material. In other words, the topologically optimized fork arch 316, is manufactured separately from the right lower tube 204 and left lower tube 218.

In one embodiment, the topologically optimized fork arch 316 is formed with at least one lower tube as a single piece. In one embodiment, the second lower tube is attached afterward, e.g., during assembly.

In one embodiment, the topologically optimized fork arch 316 and/or the lower fork legs are made of castable material like magnesium, aluminum or titanium. In one embodiment, the topologically optimized fork arch 316 and/or the lower fork legs are made of fiber reinforced polymer (e.g. carbon and/or glass reinforced epoxy or PEEK or other polyarylenes) or any other suitable structural material providing a suitably high level of strength, stiffness and impact resistance or any suitable combination thereof.

Further discussion of the operation and performance of a fork arch of a fork assembly can be found in U.S. Pat. No. 9,975,595, which is incorporated by reference herein, in its entirety.

In one embodiment, during assembly, the separate pieces may be individually adjusted to attain a desired alignment relative to each other. When properly aligned, the telescopic movement of the upper tubes within the lower tubes remains near or at the lowest friction level. Once the lower fork legs are positionally adjusted such that the lower fork legs are aligned within the same horizontal and vertical planes, then embodiments enable the stabilization of these adjusted positions through attachment features found in both the topologically optimized fork arch 316 and the lower fork legs (e.g., bolt holes, screw holes, glue cavities, etc.).

In one embodiment, if the components are manufactured as separate pieces, they may be fixedly coupled during assembly using a number of methods such as, but not limited to, topologically optimized fork arch 316 being coupled with the lower fork legs using horizontal and vertical attachment bars; topologically optimized fork arch 316 being coupled with lower fork legs using a matching positive and negative spline features and then glued, screwed, bolted, or otherwise fixedly coupled onto lower fork legs.

Figure 4B:
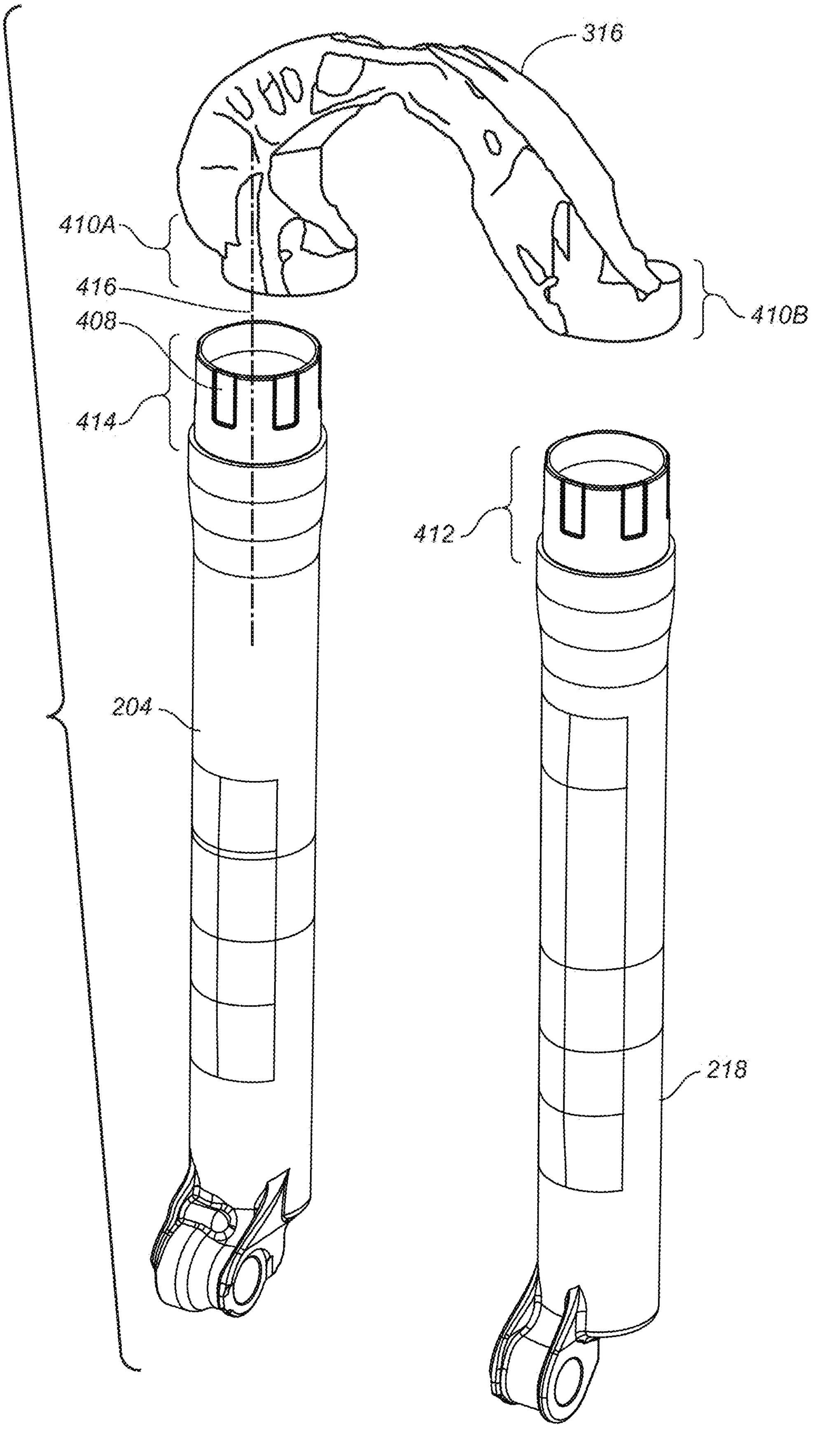
FIG. 4B is an exploded view of the topologically optimized fork arch design, a right lower tube and a left lower tube, in accordance with one embodiment.

With reference now to FIG. 4B, an exploded view of the topologically optimized fork arch 316, a right lower tube 204 and left lower tube 218 are shown in accordance with one embodiment.

In one embodiment, the right lower tube 204 has a first end 414 and the left lower tube 218 has a second end 412. The first end 414 includes a set of negative splines 408. A set of negative splines 408 is a depression within the first end 414 that is formed to lie parallel with the vertical axis 416. The topologically optimized fork arch 316 includes the right topologically optimized fork arch shoulder 410A and the left topologically optimized fork arch shoulder 410B. The inner surfaces (not shown) of the right topologically optimized fork arch shoulder 410A and the left topologically optimized fork arch shoulder 410B includes a set of positive splines configured for fitting within the set of negative splines 408. A set of positive splines is a raised vertically shaped block and is formed such that the raised positive spline fits within the negative spline depression.

In one embodiment, the raised positive splines are smaller in area than the negative spline depressions, such that when the right topologically optimized fork arch shoulder 410A and the left topologically optimized fork arch shoulder 410B are placed over the first end 414 and the second end 412 of the right lower tube 204 and the left lower tube 218, respectively, the right lower tube 204 and the left lower tube 218 may be rotated horizontally, vertically and rotationally within the fixture prior to a more permanent attachment mechanism being applied, such as, for example, glue.

Further discussion of the different methods and systems for coupling topologically optimized fork arch 316 with right lower tube 204 and left lower tube 218 can be found in U.S. Pat. No. 10,850,793 which is incorporated by reference herein, in its entirety.

Figure 5A:
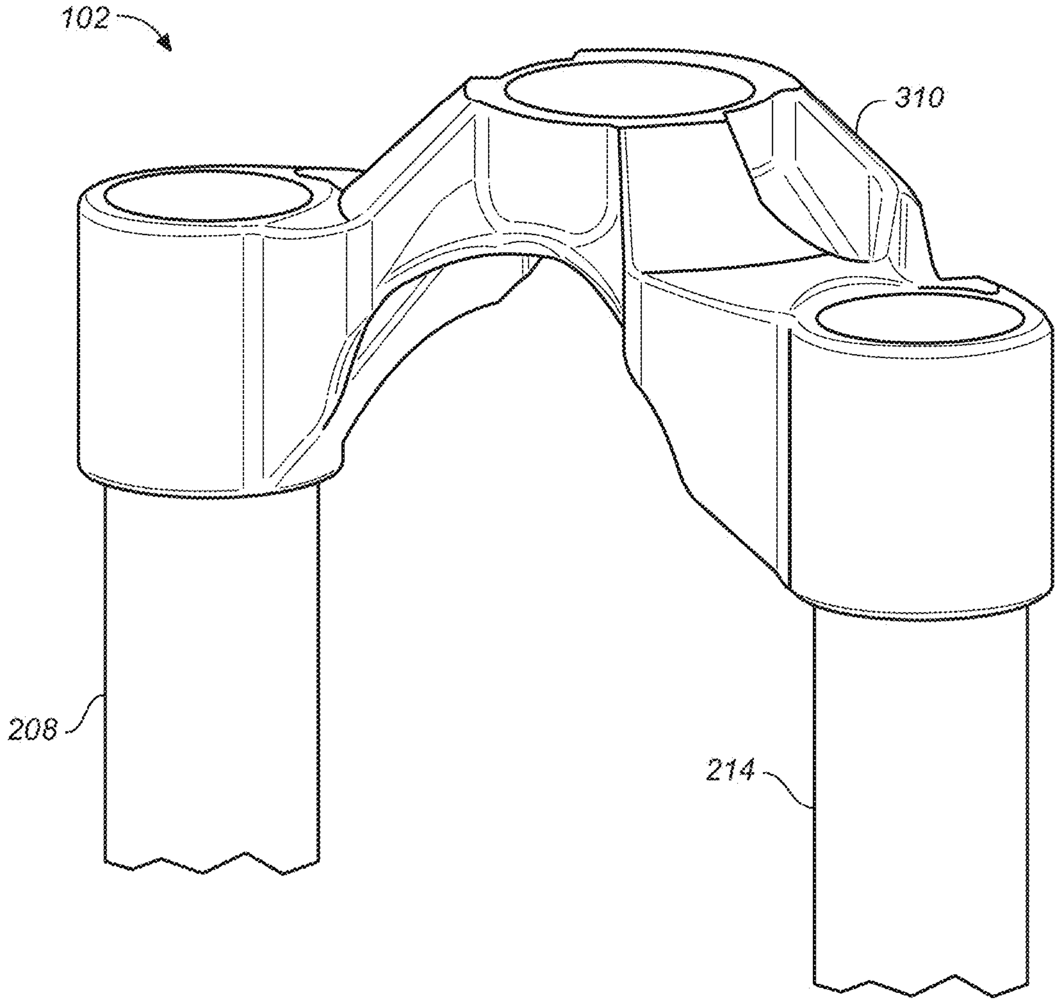
FIG. 5A is a perspective view of the relevant portions of the front fork assembly having a topologically optimized fork crown design, in accordance with one embodiment.

Referring now to FIG. 5A, a perspective view of the relevant portions of the front fork assembly 102 having a topologically optimized fork crown 310 is shown in accordance with one embodiment. In one embodiment, the topologically optimized fork crown 310 is coupled with right upper tube 208 and left upper tube 214.

Figure 5B:
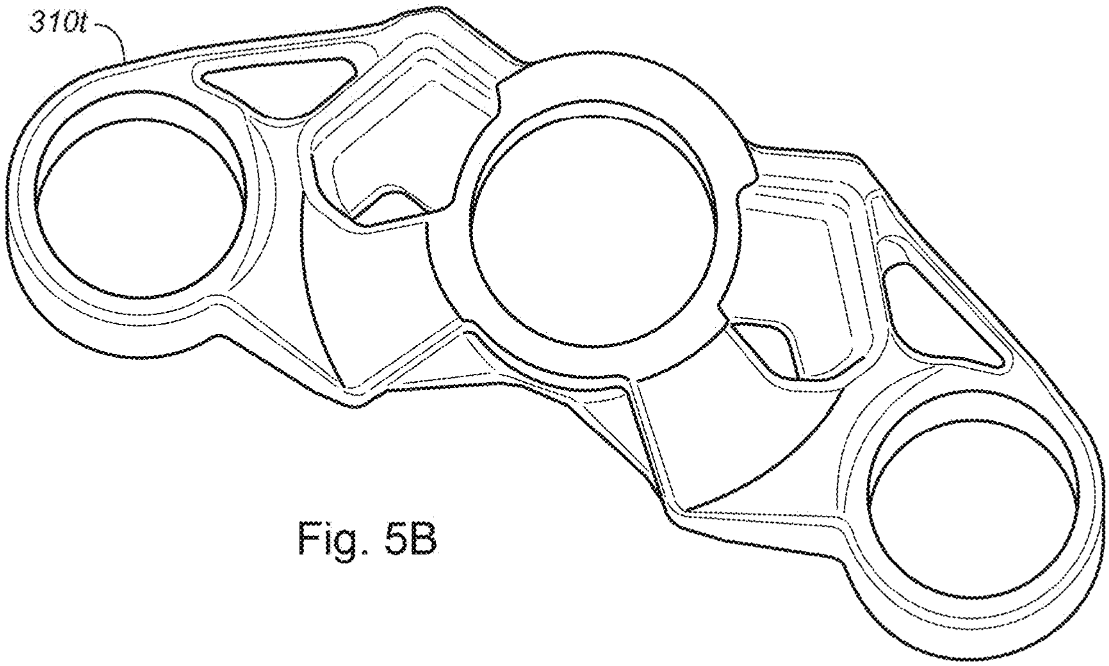
FIG. 5B is a perspective top view of the topologically optimized fork crown design, in accordance with one embodiment.
Figure 5C:
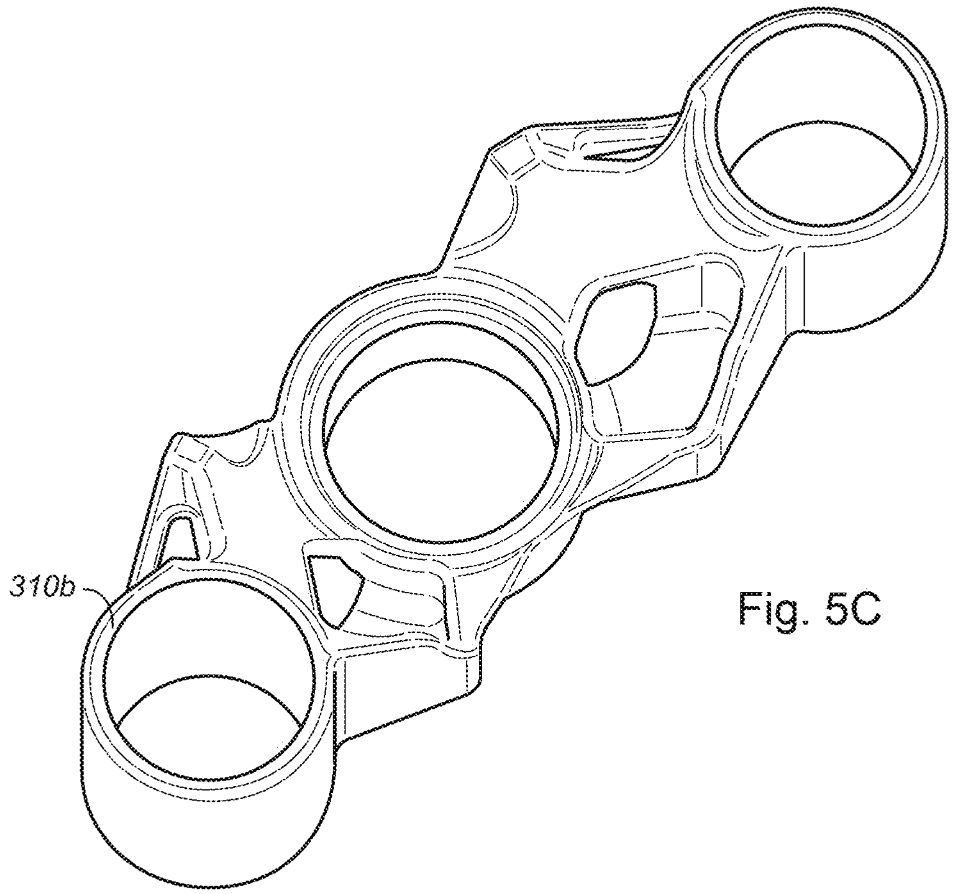
FIG. 5C is a perspective bottom view of the topologically optimized fork crown design, in accordance with one embodiment.

With reference now to FIG. 5B, a perspective top view of the topologically optimized fork crown 310*t* is shown in accordance with one embodiment. In FIG. 5C, a perspective bottom view of the topologically optimized fork crown 310*b* is shown in accordance with one embodiment.

In one embodiment, the topologically optimized fork crown 310, the right upper tube 208 and left upper tube 214 are manufactured as a single piece.

In one embodiment, the topologically optimized fork crown 310 is formed separately from the fork legs, and/or of a different material. In one embodiment, the topologically optimized fork crown 310 and/or the upper fork legs are made of castable material like magnesium, aluminum or titanium. In one embodiment, the topologically optimized fork crown 310 and/or the upper fork legs are made of fiber reinforced polymer (e.g. carbon and/or glass reinforced epoxy or PEEK or other polyarylenes) or any other suitable structural material providing a suitably high level of strength, stiffness and impact resistance or any suitable combination thereof.

Topologically Optimized Component Design

In one embodiment, such as in the topologically optimized fork arch 316, in order for the initial topologically optimized component design, the fork arch application has to be defined. Some examples of the parameters that should be defined include, but are not limited to, travel, wheel size, bike type, weight target, stiffness target, and the like.

In addition to application, the specifications for the fork arch also need to be defined. These specifications can include, but are not limited to, allowable space for the arch, clearance to other fork parts, clearance to bike model, clearance to tire model, and the like.

Further to the application and specifications for the fork arch, engineering metrics also need to be defined. These metrics can include, but are not limited to, material type, manufacturing type, maximum weight, maximum stiffness and stress thresholds, and the like.

In one embodiment, once the application, specifications, and engineering metrics are defined, the information is provided to a topological optimization design process that, in one embodiment, uses the additive process that grows material where it is best utilized to achieve weight, stiffness, and stress thresholds. E.g., one embodiment is a topological optimization that uses the additive process to work for a minimum weight of the component while achieving the requisite stiffness and stress thresholds for the component.

In one embodiment, once the application, specifications, and engineering metrics are defined, the information is provided to a topological optimization design process that, in one embodiment, uses the subtractive process that removes material to achieve weight, stiffness, and stress thresholds. E.g., one embodiment is a topological optimization that uses the subtractive process to work for a minimum weight of the component while achieving the requisite stiffness and stress thresholds for the component.

In one embodiment, once the application, specifications, and engineering metrics are defined, the information is provided to a topological optimization design process that, in one embodiment, uses both the additive and subtractive process to achieve weight, stiffness, and stress thresholds.

In one embodiment, the topological optimization is a materials-based solution. For example, is the component going to be metal, composite, or the like. In one embodiment, each of the categories could have a number of sub categories. For example, a minimal amount of a material that will achieving the requisite stiffness and stress thresholds for the component for a plurality of different materials.

For example, a composite material could be carbon fiber, carbon fiber short string, graphene gyroid, or the like. In one embodiment, the composite material may be in a woven fabric form, mat fabric form, may be preferentially oriented using unidirectional reinforcement manufacturing methods in anticipation of greater stresses in given orientations, or the like.

Examples of different metals could include metals such as, but not limited to aluminum, steel, titanium, magnesium, and the like. In one embodiment, aluminum would have a given weight and shape to meet the stiffness and stress thresholds. Steel would have a different given weight and shape to meet the stiffness and stress thresholds. Titanium would have yet another given weight and shape to meet the stiffness and stress thresholds. Magnesium would have yet another given weight and shape to meet the stiffness and stress thresholds, etc. for any desired material.

In one embodiment, the topological optimization could also include different solutions based on manufacturing capabilities. For example, milling, extrusion, layering, casting, additive manufacturing, or the like.

In one embodiment, the topological optimization could also include different materials for a mixed material component. For example, a chainring could have a spider portion that has a topologically optimized design based on a first material and a chainring outer diameter that has a topologically optimized design based on a second material.

Once the different evaluations were performed, the manufacturing costs could then be evaluated. For example, each component would have a material cost and a manufacturing cost (e.g., milled, extruded, 3D printed, cast, formed, etc.). In one embodiment, the result of the evaluation would be a number of different component material designs that could be used to cover a number of marketing scenarios.

For example, the absolute lightest component could be formed from a material such as graphene gyroid. While the manufacturing costs could make it prohibitive for mass production, it may be a component that a professional team and/or wealthy buyer would purchase.

Another light component could be a titanium component which would have a given price point based on the manufacture and materials cost that may put it in a higher cost bracket.

A composite component would again have a given price point based on the manufacture and materials cost that would also put it in a higher cost bracket.

An aluminum component would have a price point based on the manufacture and materials cost that would put it in a lower cost bracket.

A steel component would have a price point based on the manufacture and materials cost that would likely put it in a lower or even lowest cost bracket.

In one embodiment, the topologically optimized component design analysis could be performed for any number of materials. Once the analysis was made, the manufacturer would be able to determine which materials to use to form the component. In one embodiment, there may be a number of different solutions based on vehicle price point, performance requirements, etc. For example, in a regular bike, the lower cost aluminum component with the new topologically optimized component design might be used. In a mid-range bike, the titanium component with the new topologically optimized component design would be used. In a high-end performance bike, the composite component with the new topologically optimized component design would be used. In the racing team environment, the graphene gyroid topologically optimized component design would be used.

In one embodiment, in addition to the topologically optimized component design being performed for different materials, it would also be performed for one or more different applications. For example, different categories such as a road bike, gravel bike, mountain bike, e-bike, and the like would have different stiffness and stress thresholds. Moreover, within any given category there can be different travel settings (e.g., solid frame, hardtail, full suspension, etc.), wheel sizes, rim sizes, brake types, clearances, and the like.

In one embodiment, once the topological optimization is performed, a topologically optimized component design is obtained. In one embodiment, there may be a number of topologically optimized component designs obtained, where the different designs are based on different materials.

In one embodiment, the topologically optimized component design will go to the industrial design step. For example, the industrial design step is used to evaluate the topologically optimized component design for manufacturability, asthetics, or the like. In other words, to evaluate and/or adjust the topologically optimized design for one or more development realities such as manufacturability, aesthetics or the like.

For example, in one embodiment, the topologically optimized component design might not be manufacturable, might require a design adjustment to be manufacturable, might require a completely new manufacture retooling, or the like.

In one embodiment, the topologically optimized component design might not be aesthetically pleasing, or otherwise have customer appeal.

In one embodiment, if the industrial design step did make manufacturing and/or aesthetic adjustments to the topologically optimized component design, the adjusted topologically optimized component design would then go through a finite element analysis (FEA) for validation. If the FEA validated the adjusted topologically optimized component design, then the design would be sent to the design manufacture step.

In one embodiment, if the FEA validation resulted in an adjustment or modification to the adjusted topologically optimized component design, the FEA modified design would return to the industrial design, and the FEA and industrial process would continue to be iterated until a solution was reached: e.g., an adjusted topologically optimized component design with the appropriate weight, stiffness, aesthetic, and the like.

In one embodiment, when the solution is reached, the topologically optimized component design will be sent to the design for manufacturing step where the manufacturing process for the component design solution would be developed.

Once the manufacturing process was developed, the topologically optimized component design would enter the print/model release process where the component would be manufactured. After that, the component would be assembled and/or packaged for consumption.

In one embodiment, the topological optimization is performed by a computer aided design (CAD) program. In one embodiment, the topologically optimized fork arch 316 is shown in FIGS. 3-4B and it puts the material in structural places that are defined to optimize the material. As seen in FIG. 4A, in one embodiment, the topologically optimized fork arch 316 design may not be manufacturable and/or may not be aesthetically pleasing (e.g., nice to look at).

As described herein, in one embodiment, if the topologically optimized design is manufacturable but not aesthetically pleasing, it may still be manufactured as is to provide a "best solution" component.

In one embodiment, as described herein, if the topologically optimized design is manufacturable but not aesthetically pleasing, it will go through the industrial design and FEA iterations until an aesthetically pleasing topologically optimized design is reached. This would be an example of a "best aesthetic solution" component.

In one embodiment, as described herein, if the topologically optimized design is not manufacturable (or not manufacturable using a company's available manufacturing techniques), it will go through the industrial design and FEA iterations until it reaches a manufacturable design. This would be an example of a "best solution based on manufacturing capabilities" component.

In one embodiment, as described herein, if the topologically optimized design is not manufacturable (or not manufacturable using a company's available manufacturing techniques), it will go through the industrial design and FEA iterations until it reaches a manufacturable design. However, if the topologically optimized manufacturable design is not aesthetically pleasing, it will again go through the industrial design and FEA iterations until an aesthetically pleasing topologically optimized manufacturable design is reached. This would be an example of a "best aesthetic solution based on manufacturing capabilities" component.

For example, FIGS. 5A-5C illustrate an aesthetically pleasing topologically optimized manufacturable crown component, shown in accordance with one embodiment.

Although a fork, fork arch, and crown are shown, it should be appreciated that in one embodiment, one or more components of a vehicle could be designed using the topologically optimized design process described herein. Other components include, but are not limited to, seatposts, hub shells, cranks, handlebars, levers, rotors, gears, shock mounts, shock bodies, wheels, roll cages, hulls, etc.

Thus, unlike prior design methods, the present technology provides a seed design (e.g., the topologically optimized component design) as a starting point for the finalized component design that is then evaluated and adjusted for asthetics and/or manufacturability. Moreover, by performing the topologically optimized component design for a number of different materials, the "seed design" would be available for different material types, different cost tiers, different performance tiers, super high end performance components, and the like.

For example, the present technology will allow for a component design, e.g., a topologically optimized fork arch 316 in this example, that will look different based on the material used. In other words, as well as providing a material saving design, in one embodiment, each material's "seed design" would have its own unique design characteristics. In one embodiment, the unique design characteristics would be identifiable from looking at the component. For example, a rider having a titanium fork arch would be able to identify another bike with a magnesium fork arch, or another bike with a composite fork arch, or a graphene gyroid design, etc. The rider would be able to admire the component, ask about the component, discuss performance and/or style differences with the other bike rider, etc.

As such, the different component weight and/or designs asthetics could be used as advertising, reasons for an upgrade, and the like.

In one embodiment, the topological design could be based on a best weight for a predefined stiffness. In another embodiment, the topological design would provide a weight reduction for an existing component, while providing an increased level of predefined stiffness. In yet another embodiment, the topological design would provide no weight reduction for a component, while providing a maximum increase in a level of stiffness, strength, durability, etc.

Thus, for example, in a mountain bike component design, the weight reduction would not be as high of a priority as durability, stiffness, endurance, or the like. In one embodiment, such as a mountain bike component design, there may be a need for an increased level of stiffness but the topological design can provide the design that meets the increased level of stiffness while also reducing the component weight.

In another example, such as a road bike component design, the weight reduction would be of a higher priority than any increase in stiffness, durability, endurance, or the like of an existing component. As such, the component stiffness requirements would be set at a predefined level and the topological design would then work on providing the lightest design that meets the stiffness requirements.

Again, the topological design would be able to provide such weight, stiffness or other predefined design limitations across a number of different materials to provide a number of different solutions that may be established as a cost tier, a performance tier, etc. and wherein each of the different material designs could be individualized to provide the readily and visually identifiable component types. E.g., an aluminum component looks like regular, while a composite component looks sleek/futuristic/intimidating, etc.

Restructured Topology of Crown

Typically, in complicated multi-load scenarios, a crown with a filled box design for the arms is considered the ideal structure to handle such loads. However, embodiments described herein are as strong if not stronger than a filled box design.

Figure 6:
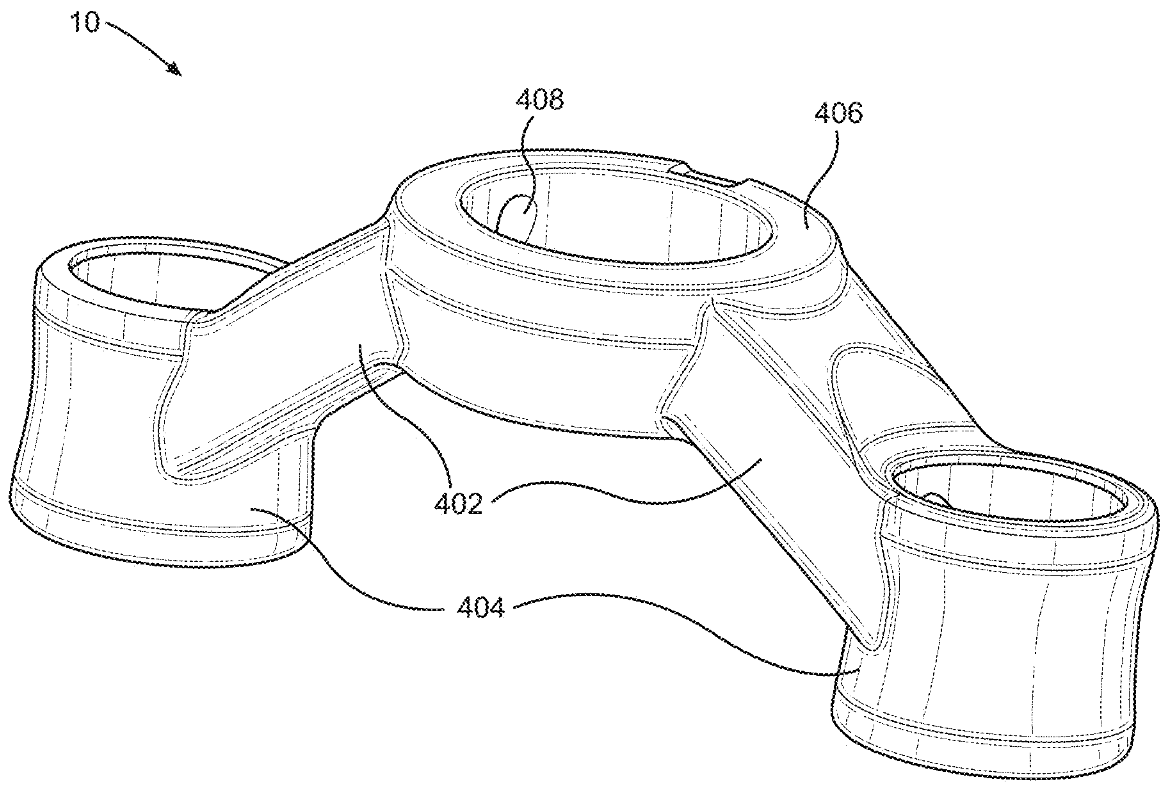
FIG. 6 is a perspective view of a crown with a lightening bore, according to one embodiment.

FIG. 6 is a perspective view of a crown 10 with a lightening bore 408, according to one embodiment. Crown 10 also has a first arm and a second arm (collectively referred to as arms 402), a first and second upper tube boss (collectively referred to as upper tube boss 404), and steerer tube boss 406. In some cases, arms 402 may also be referred to as legs. In one embodiment, the first upper tube boss and the second upper tube boss reside on plane 720 (shown in at least FIG. 16) on opposing sides of the steerer tube boss. In one embodiment, plane 720 comprises the central axes of the upper tube bosses 404. The arms 402 are used to connect upper tube boss 404 to steerer tube boss 406.

In order to reduce weight in crown 10, lightening bores 408 are made within arms 402. Lightening bores 408 are made via subtractive manufacturing after the rest of crown 10 is formed. Conventionally, crown 10 is formed with forging or machining, while the lightening bore is secondary manufacturing.

Figure 7:
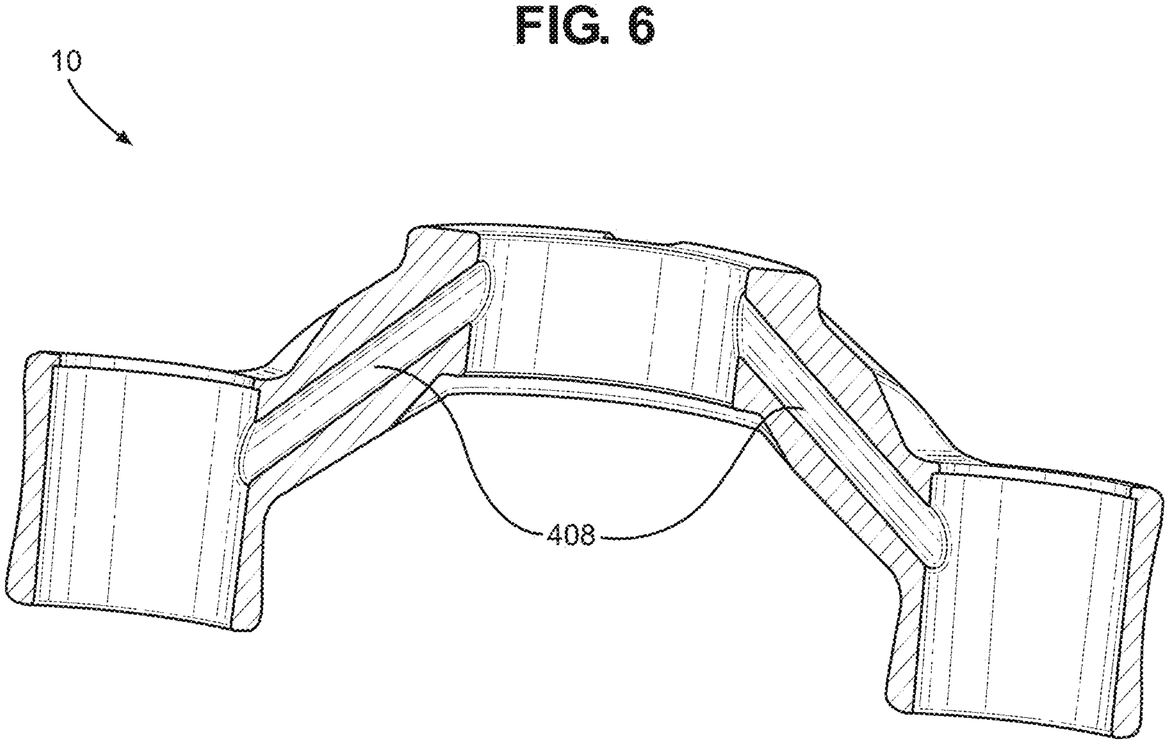
FIG. 7 is a cross section view of a crown with lightening bores, according to one embodiment.

FIG. 7 is a cross section view of a crown 10 with lightening bores 408, according to one embodiment. In one embodiment, lightening bores 408 are through holes, and extend all the way through arms 402. In one embodiment, lightening bores run through the arms 402 along or colinear with plane 720 (shown at least in FIG. 16).

Figure 8:
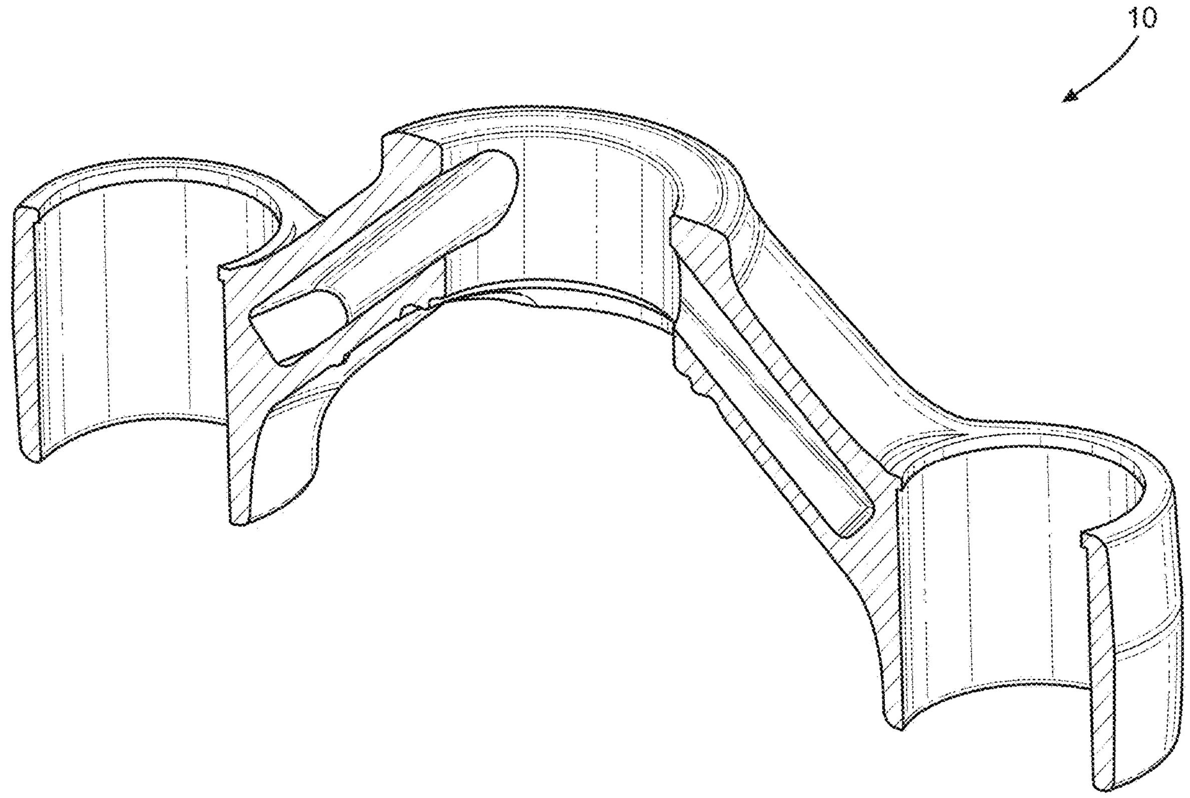
FIG. 8 is a cross section perspective view of a conventional crown, according to one embodiment.

FIG. 8 is a cross section perspective view of a conventional crown 10, according to one embodiment. In one embodiment. Lightening bores 408 are blind holes. In one embodiment, as seen in at least FIG. 8, lightening bores 408 extend through at least part of arms 402 and have an opening in the steerer tube boss 406 but not in the upper tube boss 404. In one embodiment, lightening bores 408 extend through at least part of arms 402 and have an opening in the upper tube boss 404 but not in the steerer tube boss 406.

In one embodiment, lightening bores 408 have an opening in at least the upper tube boss 404 and can be used to expand the volume of a chamber within the upper tube. For additional detail and description of a crown air volume, see, as an example, U.S. Patent Application 2021-0237824 A1 the content of which is incorporated by reference herein, in its entirety.

Figure 9:
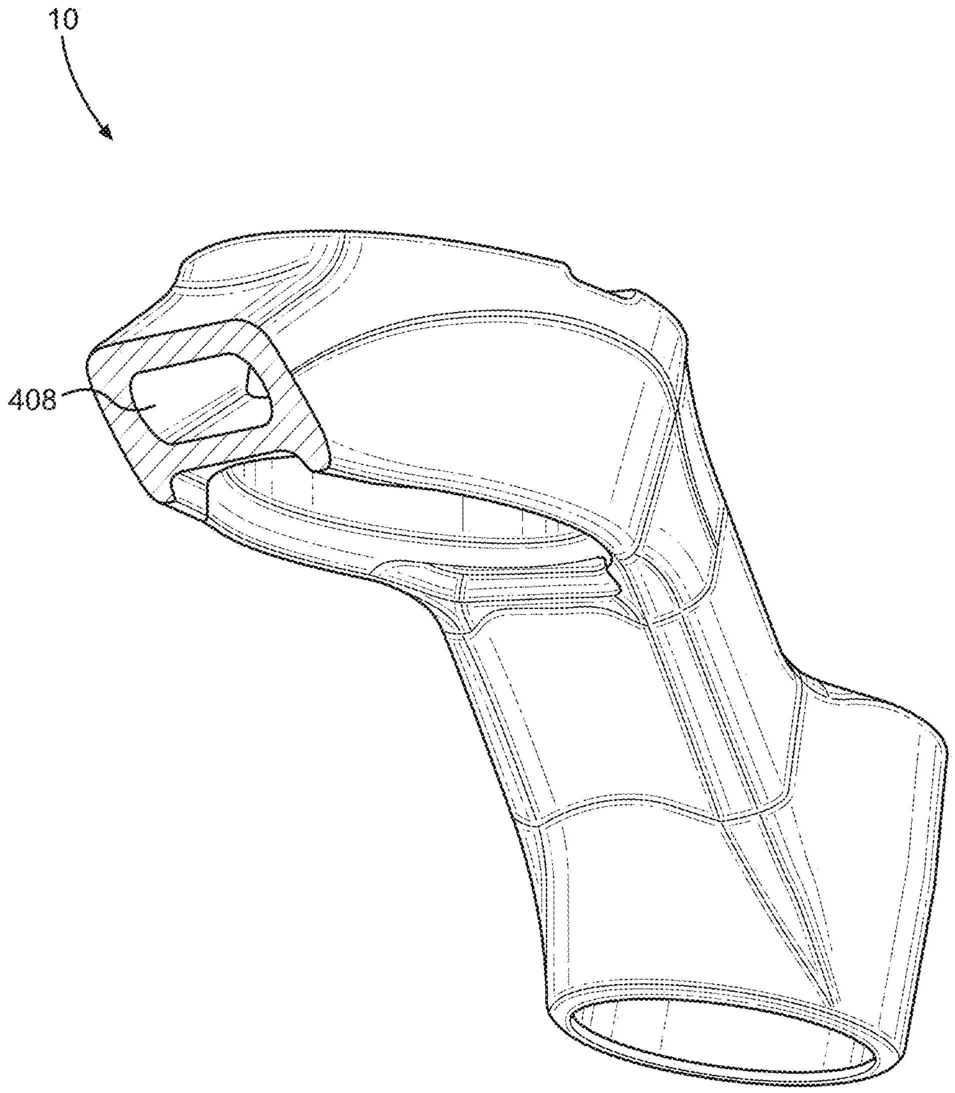
FIG. 9 is a lower cross section perspective view of a conventional crown.
Figure 10A:
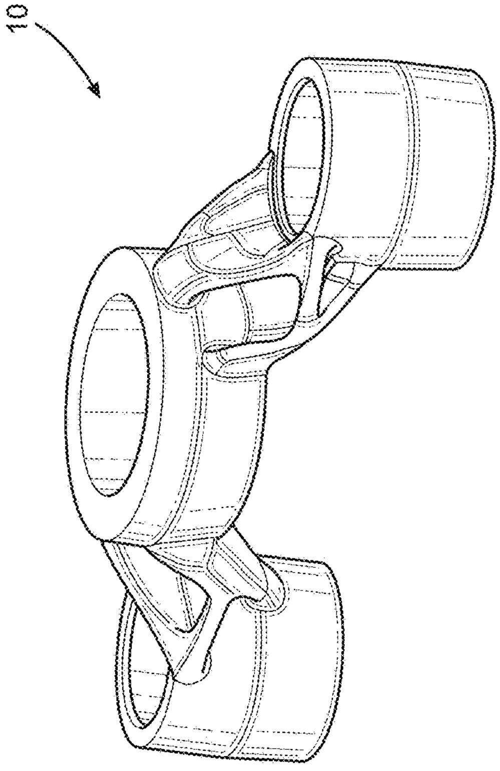
FIG. 10A-10D are perspective views of topological optimization outputs for arms of crown.
Figure 10B:
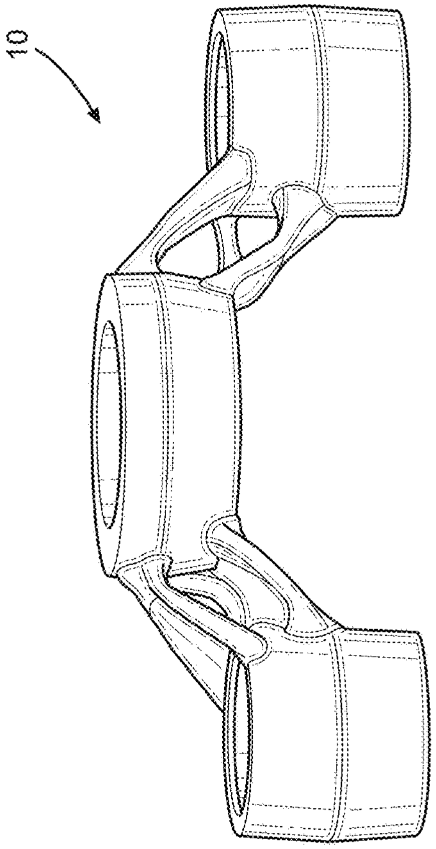
Figure 10C:
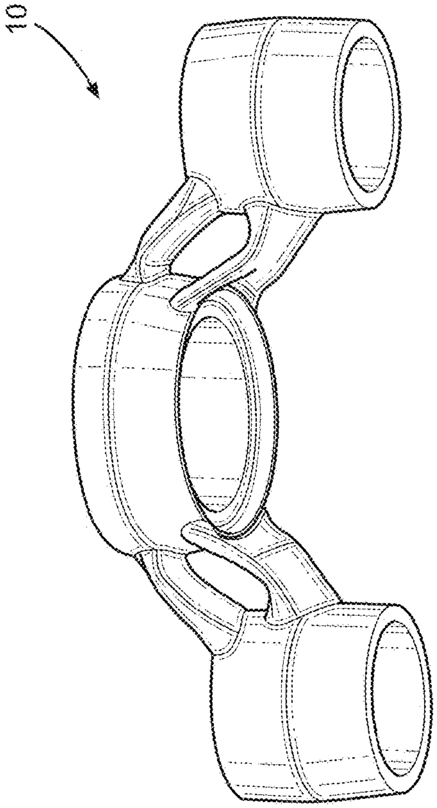
Figure 10D:
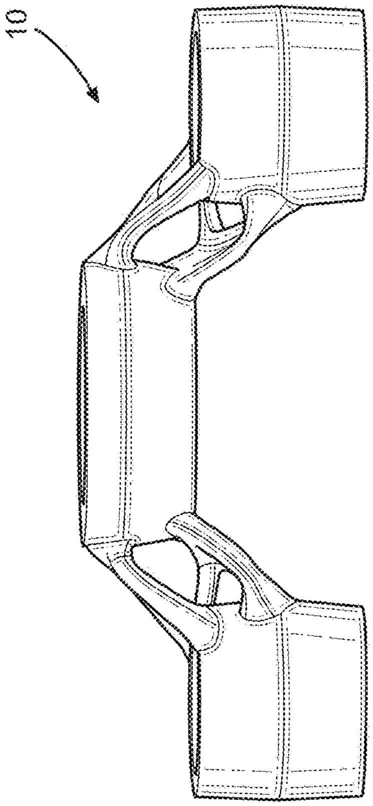

FIG. 9 is a lower cross section perspective view of a conventional crown 10.

FIG. 10A-10D are perspective views of topological optimization outputs for arms 402 of crown 10. FIG. 10A-10D (collectively referred to as FIG. 10) show the results of topological optimization of arms 402 for the appropriate forces applied to the crown 10. In the optimization process, stiffness and peak stress capabilities were maintained while cutting as much material as possible. Consistently, the results had the majority of remaining material on the top and bottom of arms 402.

Figure 11:
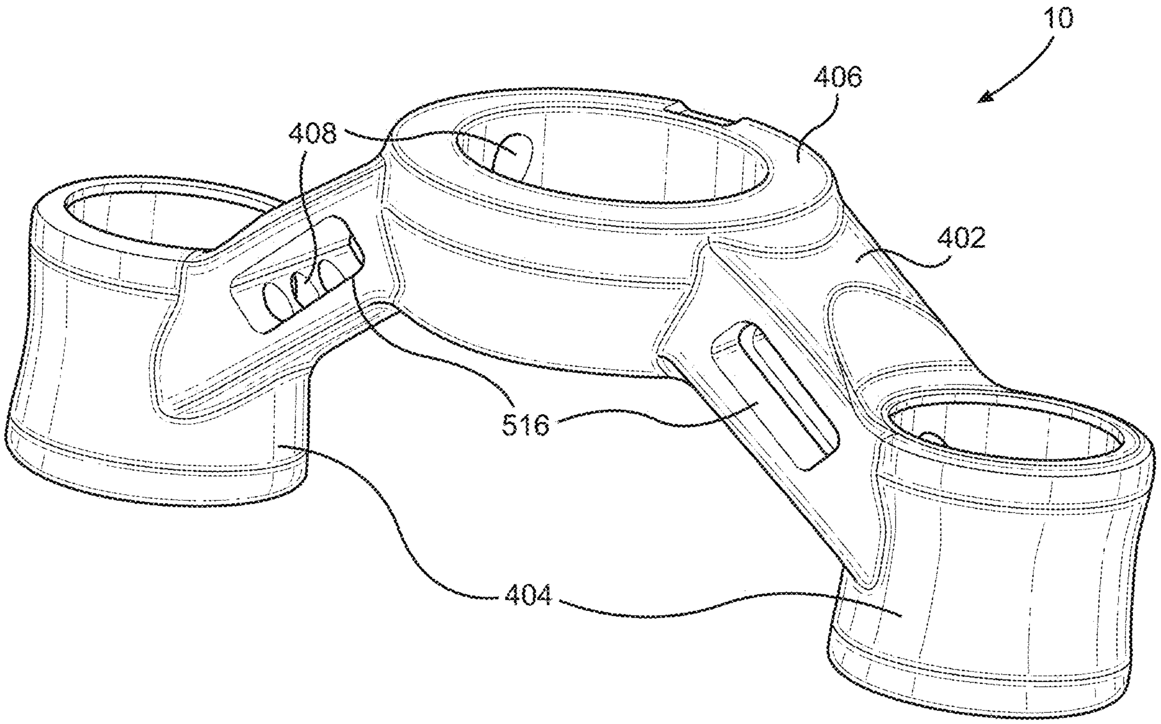
FIG. 11 is a perspective view of crown with an optimized arm structure, according to one embodiment.

FIG. 11 is a perspective view of crown 10 with an optimized arm structure, according to one embodiment. In one embodiment, Crown 10 has bores 516 that extend through at least one arm 402 in a generally forward to aft direction, as shown in at least FIG. 11. In one embodiment, bores 516 are in addition to lightening bores 408. In one embodiment, there are multiple lightening bores 408 in each arm. In one embodiment, bores 516 are present without any lightening bores 408.

Figure 12:
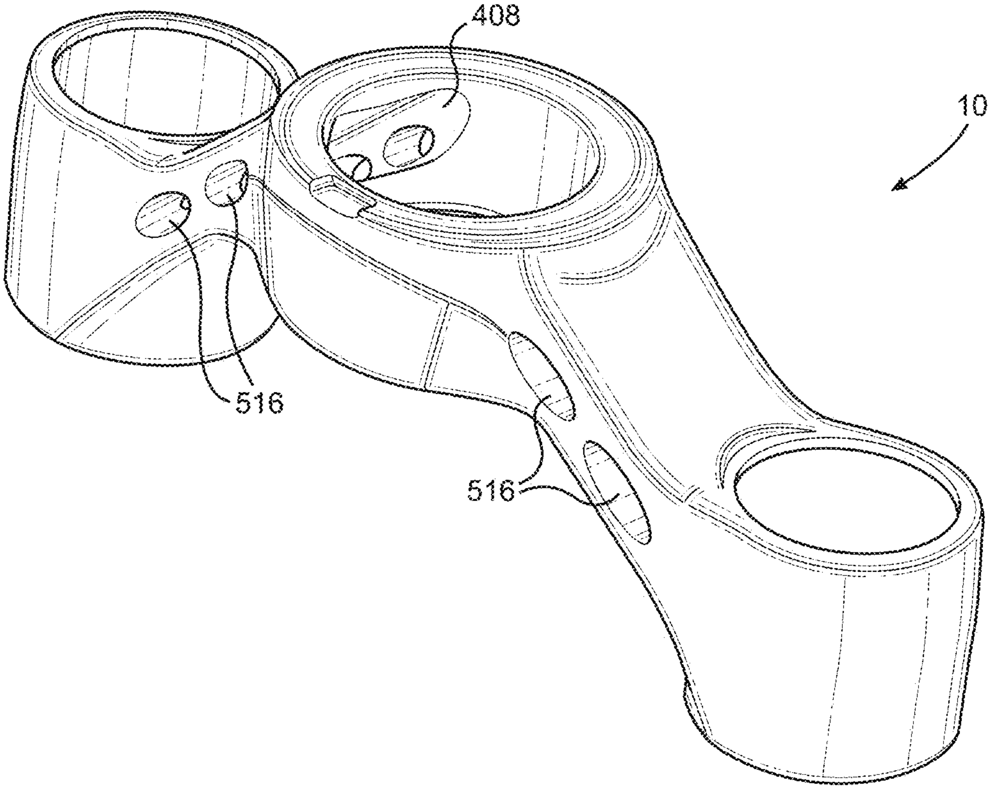
FIG. 12 is a perspective view of crown with an optimized arm structure, according to one embodiment.

In one embodiment, bores 516 are approximately rectangular in shape, however it should be understood that the shape of bores 516 is not limited to any particular shape, as shown by at least FIG. 10 and FIG. 12.

FIG. 12 is a perspective view of crown 10 with an optimized arm structure, according to one embodiment. In one embodiment, as seen in at least FIG. 12, there can be multiple bores 516 on a single arm 402. In one embodiment, bores 516 are approximately oval in shape. In one embodiment, a singular lightening bore 408 is used in each arm.

Figure 13:
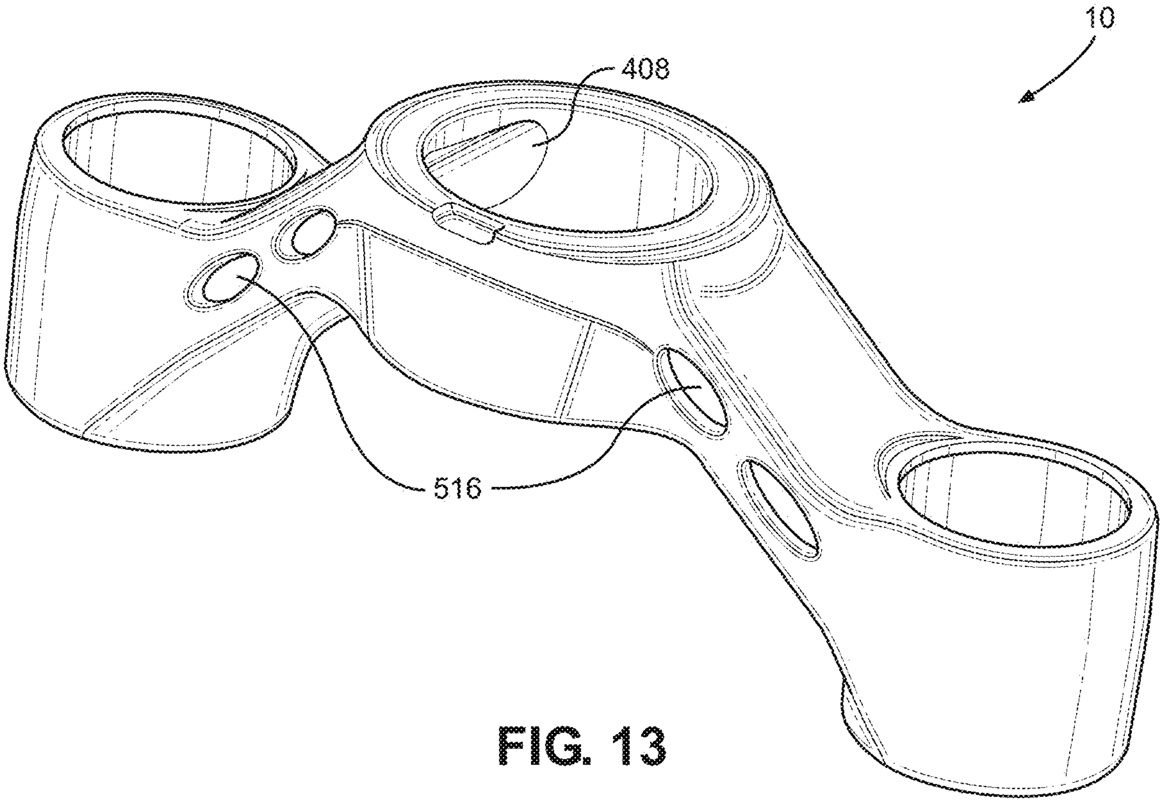
FIG. 13 is a perspective view of crown with an optimized arm structure, according to one embodiment.

FIG. 13 is a perspective view of crown 10 with an optimized arm structure, according to one embodiment. In one embodiment, bores 516 are blind holes. Similar to other embodiments, embodiments with blind bores 516 are not limited to a specific shape. In one embodiment there is at least one bore 516 on each arm 402. In one embodiment, bores 516 have a depth to where they do not intersect with any lightening bores 408 present.

Figure 14:
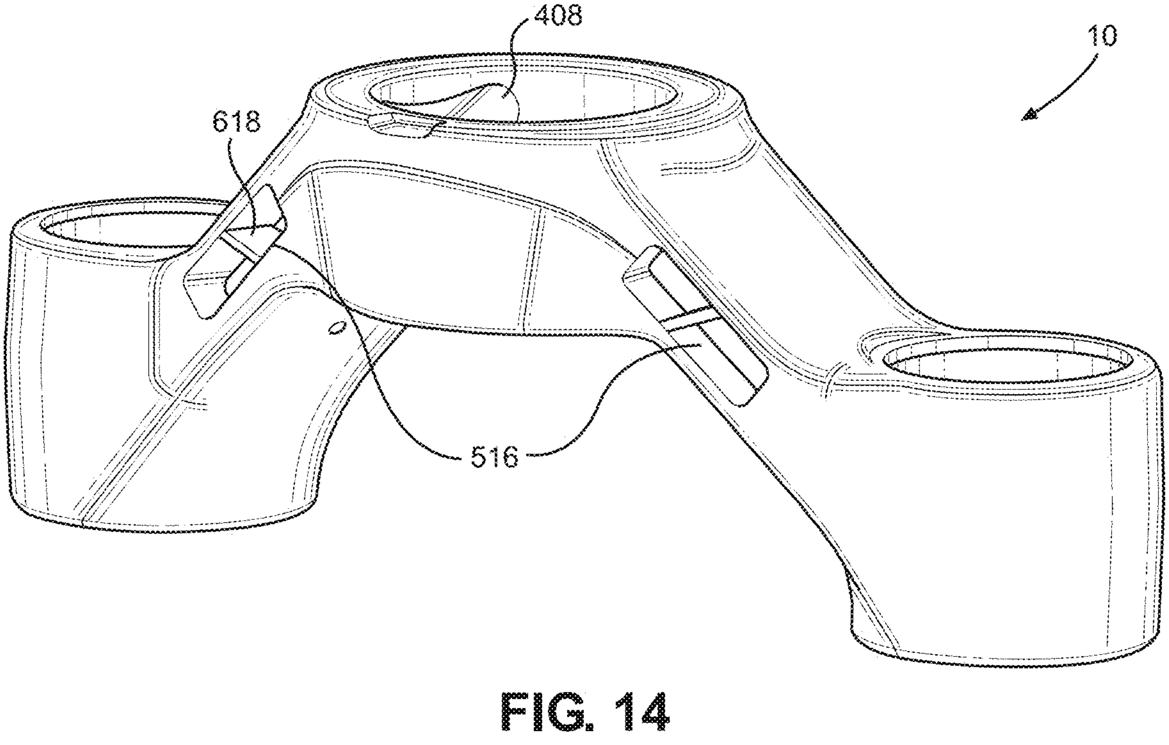
FIG. 14 is a perspective view of crown with an optimized arm structure, according to one embodiment.

FIG. 14 is a perspective view of crown 10 with an optimized arm structure, according to one embodiment. In one embodiment, a support 618 extends through bore 516 in a forward to aft direction. In one embodiment, support 618 is perpendicular to the surfaces where it joins with bore 516. In one embodiment, support 618 is slanted and at an angle that is not perpendicular to the surfaces where it joins with bore 516. In one embodiment, support 618 is added after bore 516 is formed. In one embodiment, support 618 is made from the same part as crown 10. In one embodiment, support 618 extends all the way through arm 402. In one embodiment, there is a gap in support 618 where bores 516 intersect lightening bores 408. In one embodiment, support 618 is a plane, however it should be understood that the shape of support is not limited to a plane.

Figure 15:
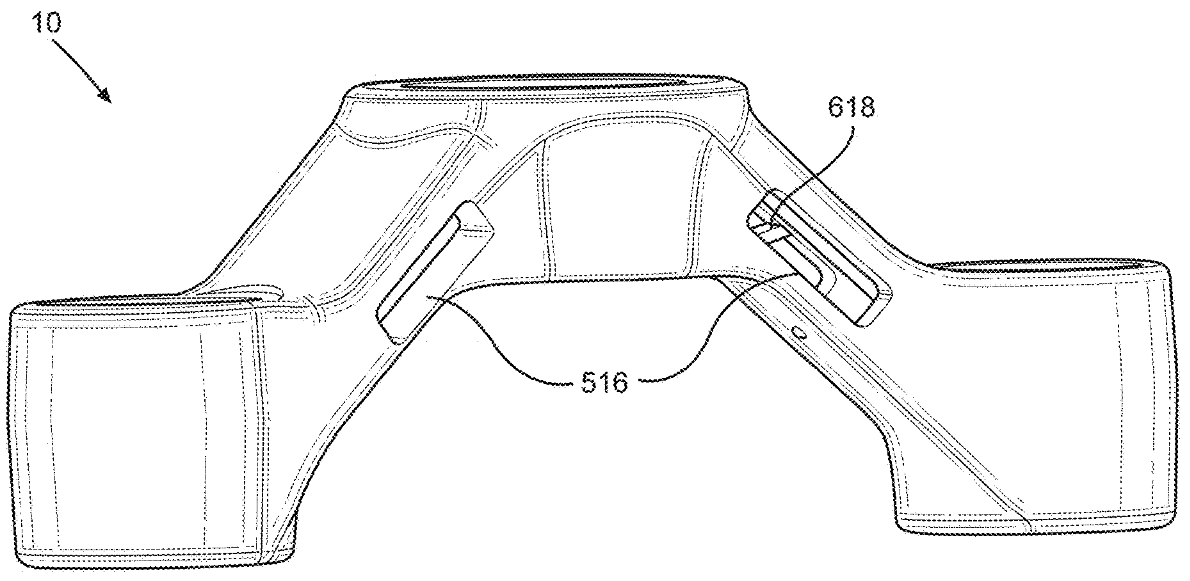
FIG. 15 is a perspective view of crown with an optimized arm structure, according to one embodiment.

FIG. 15 is a perspective view of crown 10 with an optimized arm structure, according to one embodiment.

Figure 16:
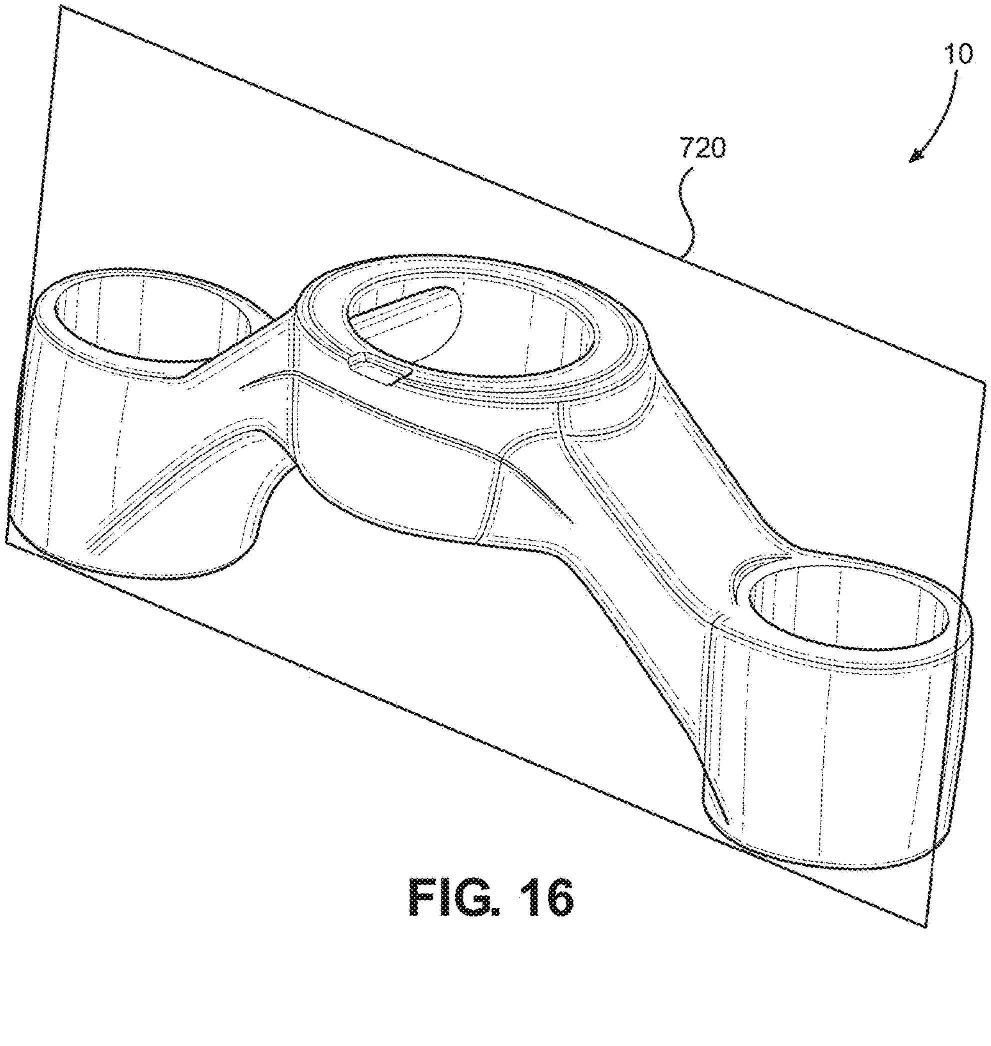
FIG. 16 is a perspective view of crown with plane.

FIG. 16 is a perspective view of crown 10 with plane 720. In one embodiment, plane 720 comprises the central axes of the upper tube bosses 404.

In one embodiment, the structure of bores 516 is not symmetrical across plane 720 (shown in at least FIG. 16). For example. In one embodiment, a support 618 is present on the aft side of plane 720 and not the forward side or vice versa. In one embodiment, the location of support 618 differs between the forward and aft sides of plane 720. In one embodiment, the shape, size, or orientation of support 618 differs between the forward and aft sides of plane 720. In one embodiment, the size of bore 516 differs between the forward and aft sides of plane 720. In one embodiment, blind bores 516 (such as those shown in at least FIG. 13) are present on one of the forward and aft sides of plane 720 and not the other. In one embodiment, the locations of bores 516 differs between the forward and aft sides of plane 720.

In one embodiment, arms 402 are symmetrical across a central axis that extends from top to bottom of plane 720. In one embodiment, arms 402 are not symmetrical across a central axis that extends from top to bottom of plane 720.

In one embodiment, bores 516 are approximately perpendicular to plane 720. In one embodiment, bores 516 are substantially normal to plane 720. In one embodiment, bores 516 are at an angle compared to plane 720. In one embodiment, bores 516 are not substantially normal to plane 720.

In one embodiment, rather than just removing material for bores 516, the topology of arms 402 is restructured strengthen parts of arms 402 that tend to bear more load. Restructuring the topology can aid in further strengthening crown 10 past the capabilities of conventional designs. In other words, restructuring the topology of crown 10 allows for the physical capabilities to be adjusted, where the mass can be the same, less than, or heavier than the mass of crown 10 with a solid box structure for arms 402.

In one embodiment, the topology of arms 402 is restructured to where crown 10 has the same overall weight, but has increased physical capabilities such as stiffness, tensile strength, and rigidity. In one embodiment, the topology of arms 402 is restructured to where crown 10 is a lighter weight, but has physical capabilities that are approximately the same, or within an acceptable range. For example, crown 10 could be 20% lighter and only 2% weaker than other configurations. In other words, the physical capabilities may be decreased but not to a point where it is detrimental to the functioning of the component. In one embodiment, the topology of arms 402 is restructured to where crown 10 is a heavier weight, but has increased physical capabilities. For example, crown 10 could be 2% heavier but twice as strong. It should be understood that the values listed for weight to strength comparisons are for the purpose of clarity and are not meant to be limiting.

In one embodiment, the removed material that forms bores 516 is removed along a line that is approximately perpendicular to plane 720. In one embodiment, the removed material that forms bores 516 is removed along a line that is substantially normal to plane 720. In one embodiment, the removed material that forms bores 516 is removed along a line that is at an angle compared to plane 720. In one embodiment, the removed material that forms bores 516 is removed along a line that is not substantially normal to plane 720.

In one embodiment, material is placed over bores 516 to prevent mud and debris from getting stuck in bores 516.

In one embodiment, crown 10 has improved aerodynamics due to bores 516.

Figure 17:
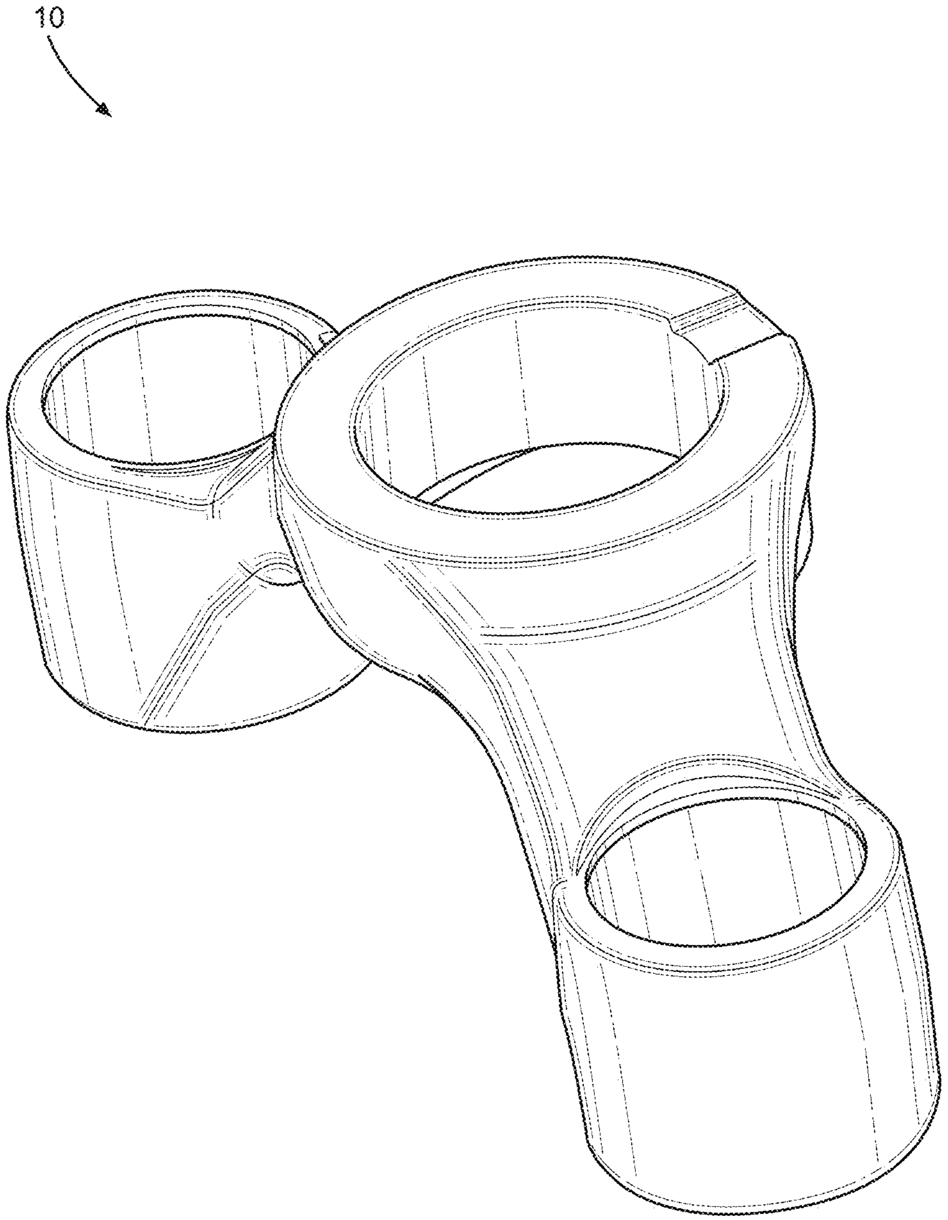
FIG. 17 is a perspective view of crown with a captured void, according to one embodiment.

FIG. 17 is a perspective view of crown 10 with a captured void, according to one embodiment. In one embodiment, the removed material can not be seen from the outside of crown 10, as seen in at least FIG. 17. In one embodiment, crown 10 would appear solid from an outside view.

Figure 18:
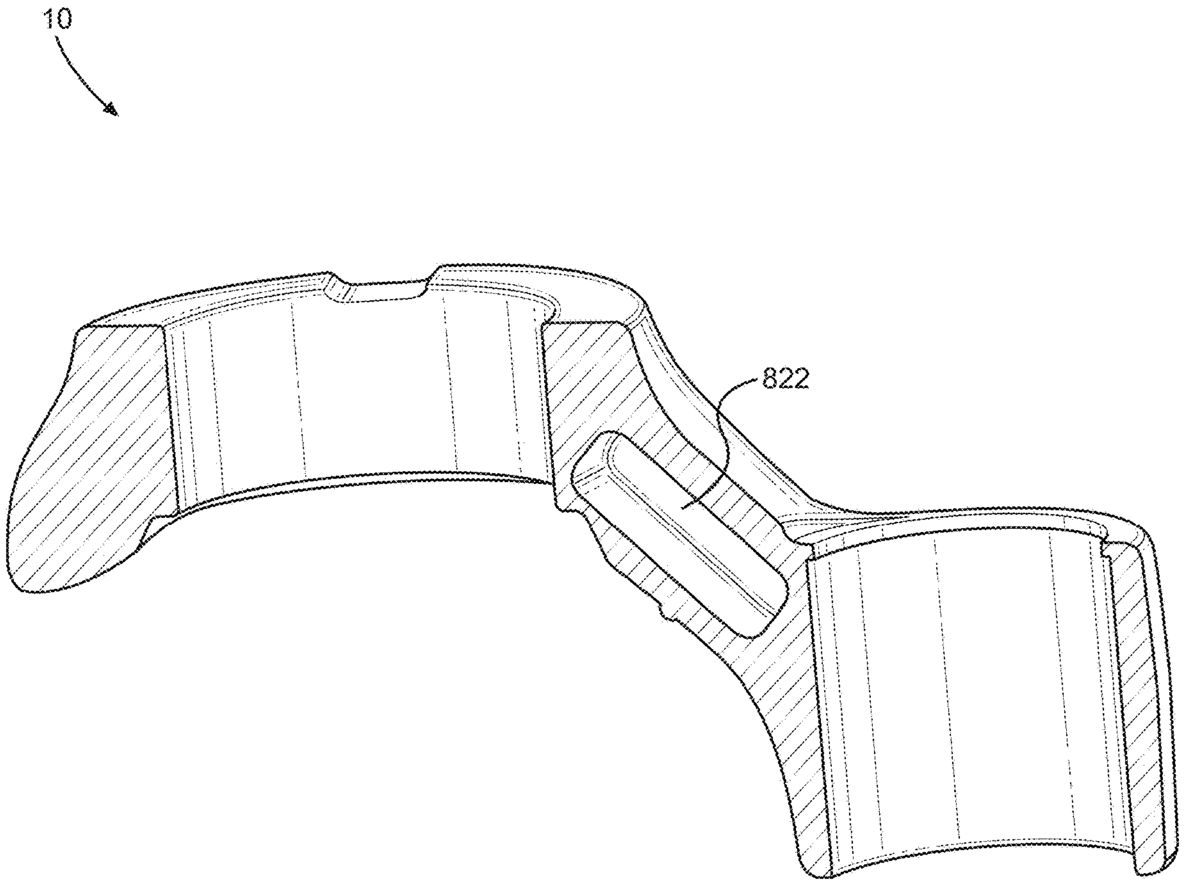
FIG. 18 is a cross section view of crown with a captured void, according to one embodiment.

FIG. 18 is a cross section view of crown 10 with a captured void 822, according to one embodiment. In one embodiment, void 822 is formed in at least one arm 402. In one embodiment, void 822 is roughly a rectangle, however void 822 may be other shapes such as, for example, an oval. In one embodiment, there is at least one support 618 in the captured void 822. In one embodiment, there are multiple, separate captured voids. In one embodiment, the at least one void 822 are symmetrical between the forward and aft sides of plane 720. In one embodiment, the at least one void 822 are not symmetrical between the forward and aft sides of plane 720.

In one embodiment, the presence of a captured void formed in at least one crown arm can be partially seen from outside of crown 10 in the form of a boss or hump, for example. In such an embodiment the cross-section of the captured void is larger than the visible portion of the cavity. For example, in one embodiment captured void 822 has an oval shaped cross section that is large enough to intersect with at least one of the top and bottom of arm 402. In such a case, a bubble or hump would be present at the intersection to ensure that arm 402 maintains the desired physical capabilities while captured void 822 is still fully enclosed.

Figure 19:
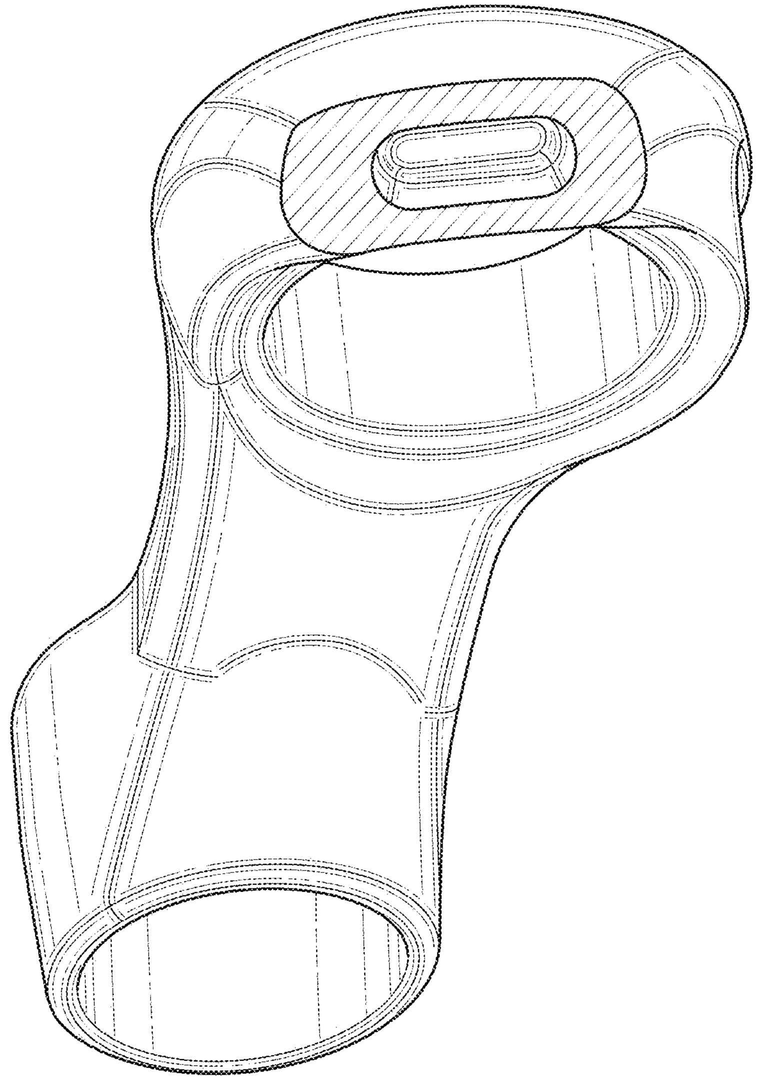
FIG. 19 is a cross section view of an arm of crown with a captured void, according to one embodiment.

FIG. 19 is a cross section view of an arm 402 of crown 10 with a captured void 822, according to one embodiment.

Figure 20:
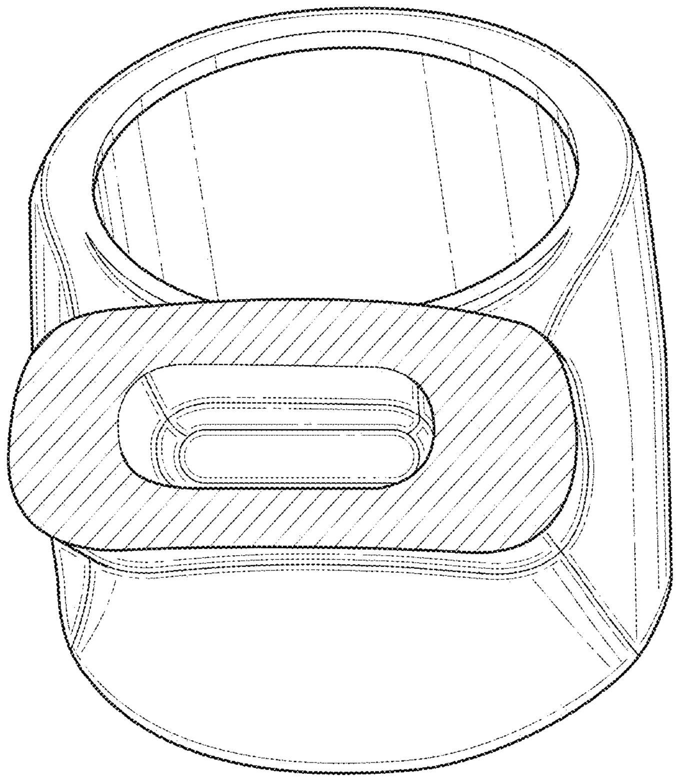
FIG. 20 is a cross section view of an arm of crown with a captured void, according to one embodiment.

FIG. 20 is a cross section view of an arm 402 of crown 10 with a captured void 822, according to one embodiment.

In one embodiment, crown 10 is forged, cast, machined, or printed with additive manufacturing.

Typically, when casting a part with a void or hollow interior a drainage hole is needed to remove the mold. With additive manufacturing, a drainage hole is not required which allows the part to have a smooth, uninterrupted surface and a hollow interior. In one embodiment, crown 10 is formed with an additive manufacturing process such as 3D printing. In one embodiment, after crown 10 is printed it undergoes post processing, for example surface finishing, support removal, heat treatment, annealing, hot isostatic pressing, etc.

One benefit of forming crown 10 through additive manufacturing would be the ability to produce forms that would be difficult if not impossible to make with subtractive manufacturing methods (for example, void 822). Due to the increased strength, rigidity, and tension parameters of crown 10 that are realized by its features, the use of additive manufacturing for production is possible.

In one embodiment, crown 10 can comprise materials such metal alloys, for example, aluminum, magnesium, titanium, or the like. In one embodiment, crown 10 can comprise composite materials, for example, fiber or glass reinforced composites, composites with thermoset or thermoplastic matrix, or similar composites. Due to the increased strength, rigidity, and tension parameters of crown 10 that are realized by its features, the use of materials not previously widely accepted for use is possible.

Plugs and Wraps

Figure 21:
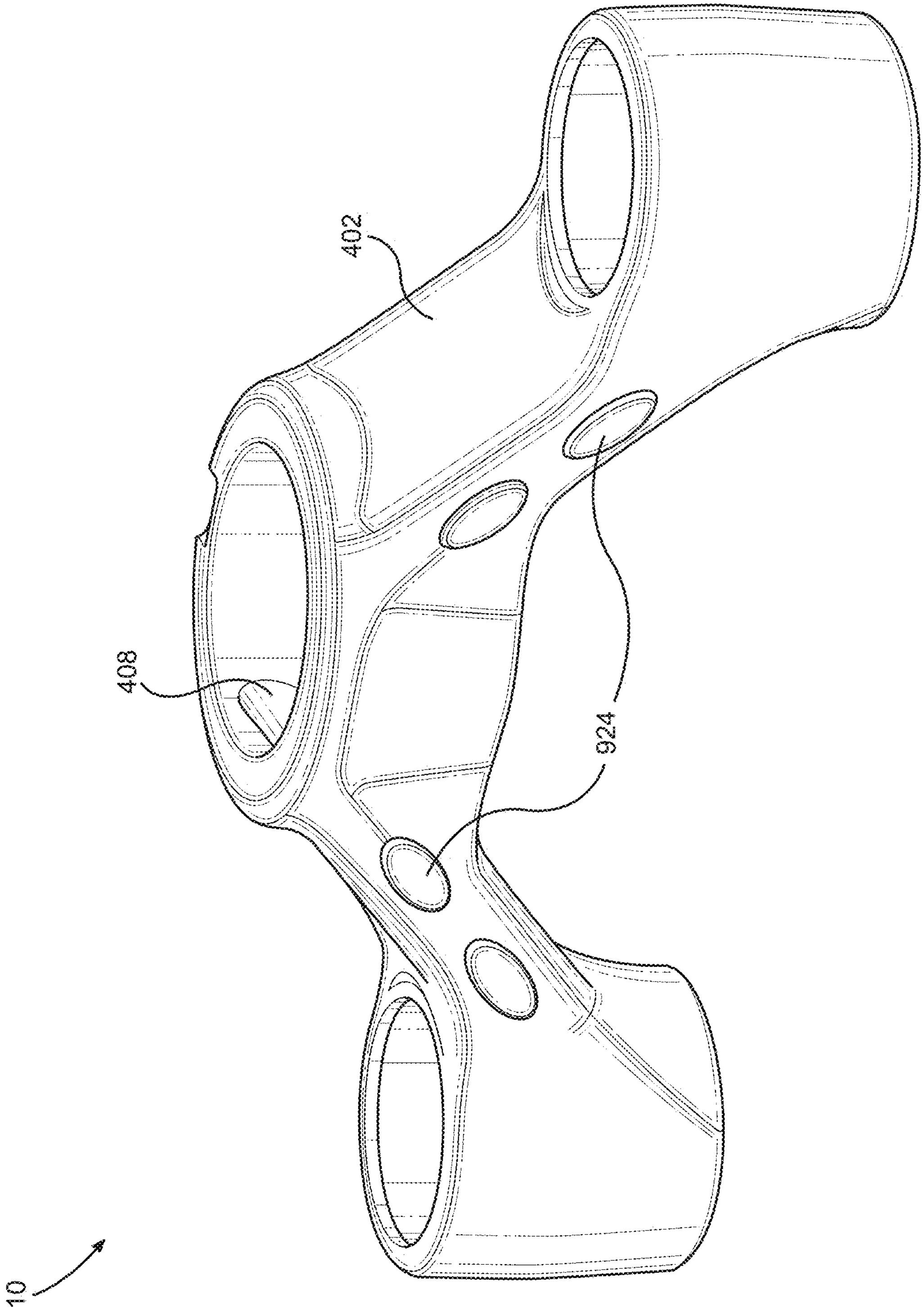
FIG. 21 is a perspective view of crown with plugs, according to one embodiment.

FIG. 21 is a perspective view of crown 10 with plugs 924, according to one embodiment.

Figure 22:
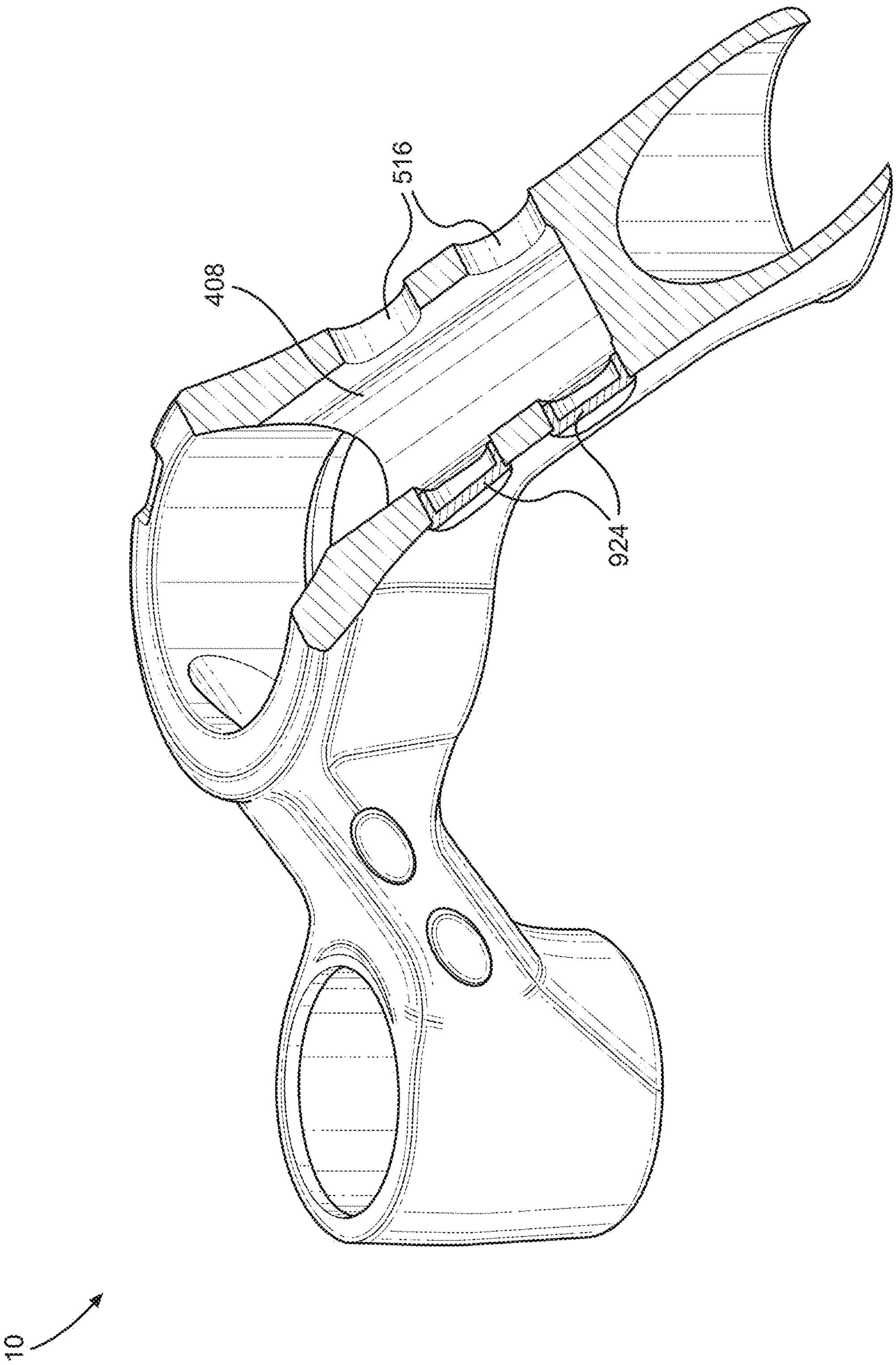
FIG. 22 is a cut away view of crown with plugs, according to one embodiment.

FIG. 22 is a cut away view of crown 10 with plugs 924, according to one embodiment.

Figure 23:
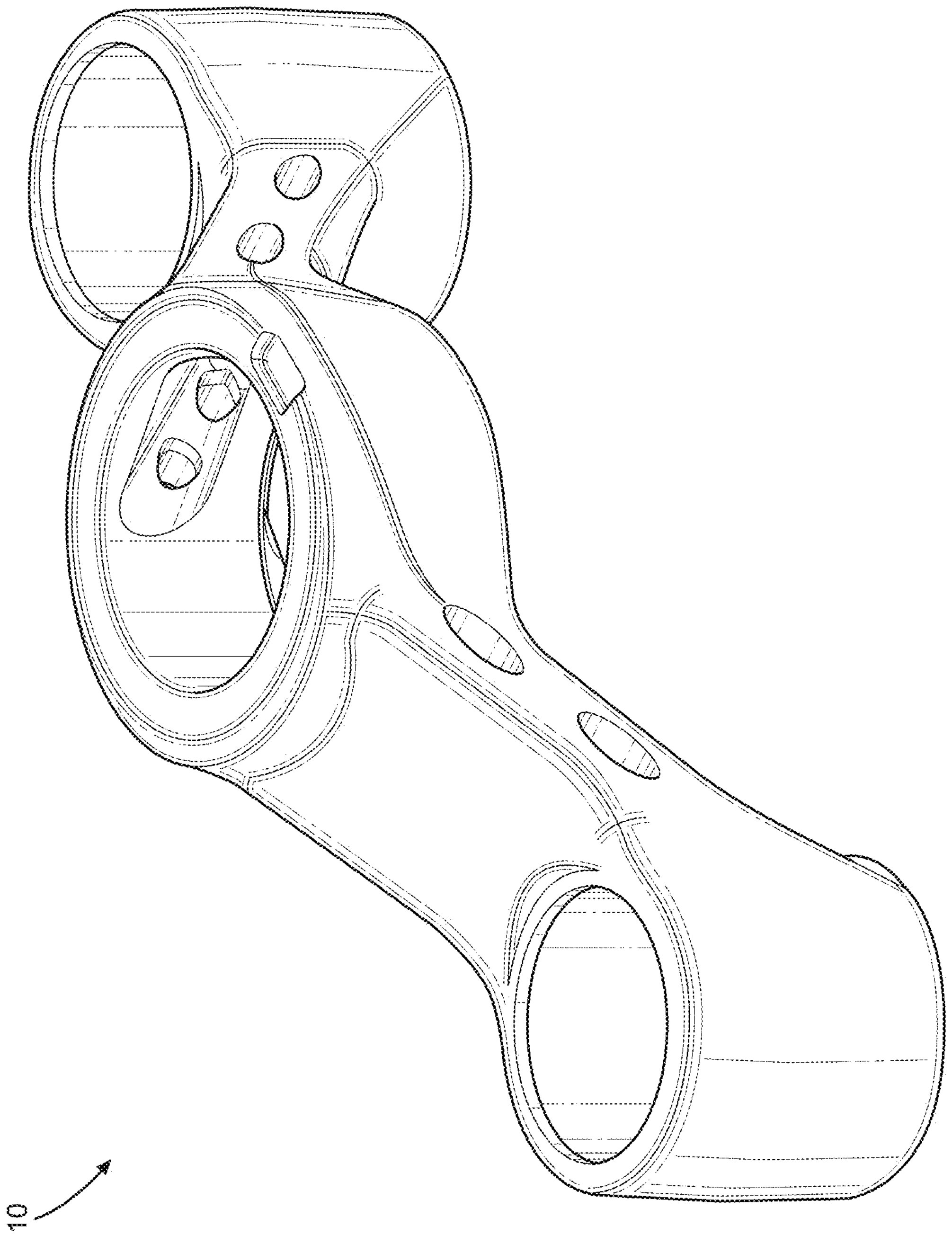
FIG. 23 is a perspective view of crown with plugs, according to one embodiment.

FIG. 23 is a perspective view of crown 10 with plugs 924, according to one embodiment.

In one embodiment, plugs 924 are used to fill in bores 516. The addition of plugs 924 gives advantages such as making the component more aesthetically pleasing, more aerodynamic, adding additional strength, and protecting the component from dirt/mud/debris and corrosion by blocking the entrance to bores 516.

In one embodiment, there is at least one plug 924 in crown 10. In one embodiment, all bores 516 in crown 10 are filled with a plug 924. In one embodiment, only some bores 516 in crown 10 are filled with a plug 924. In one embodiment, plug 924 can be added or removed, and placed as needed. In one embodiment, plug 924 is unable to be removed from crown 10.

In one embodiment, plugs 924 are made from the same material as crown 10. In one embodiment, plugs 924 are made from a different material as crown 10. In one embodiment, plugs 924 are flush with the surface of crown 10. In one embodiment, plugs 924 are difficult to distinguish from crown 10 to the average viewer. In one embodiment, plugs 924 are not flush with the surface of crown 10. In one embodiment, plugs 924 are easily distinguishable from crown 10 to the average viewer.

While plugs are shown in through bores in at least FIG. 22, it should be understood that the shape of plugs 924 is not limited to the design shown in at least FIG. 22. For example, in one embodiment plugs 924 are designed to accommodate blind bores 516, such as those shown in at least FIG. 13. In one embodiment, plugs 924 have groves to allow for support 618, shown in at least FIG. 14. In one embodiment, a single plug extends through bore 516 such that both ends of the through bore are sealed.

Figure 24:
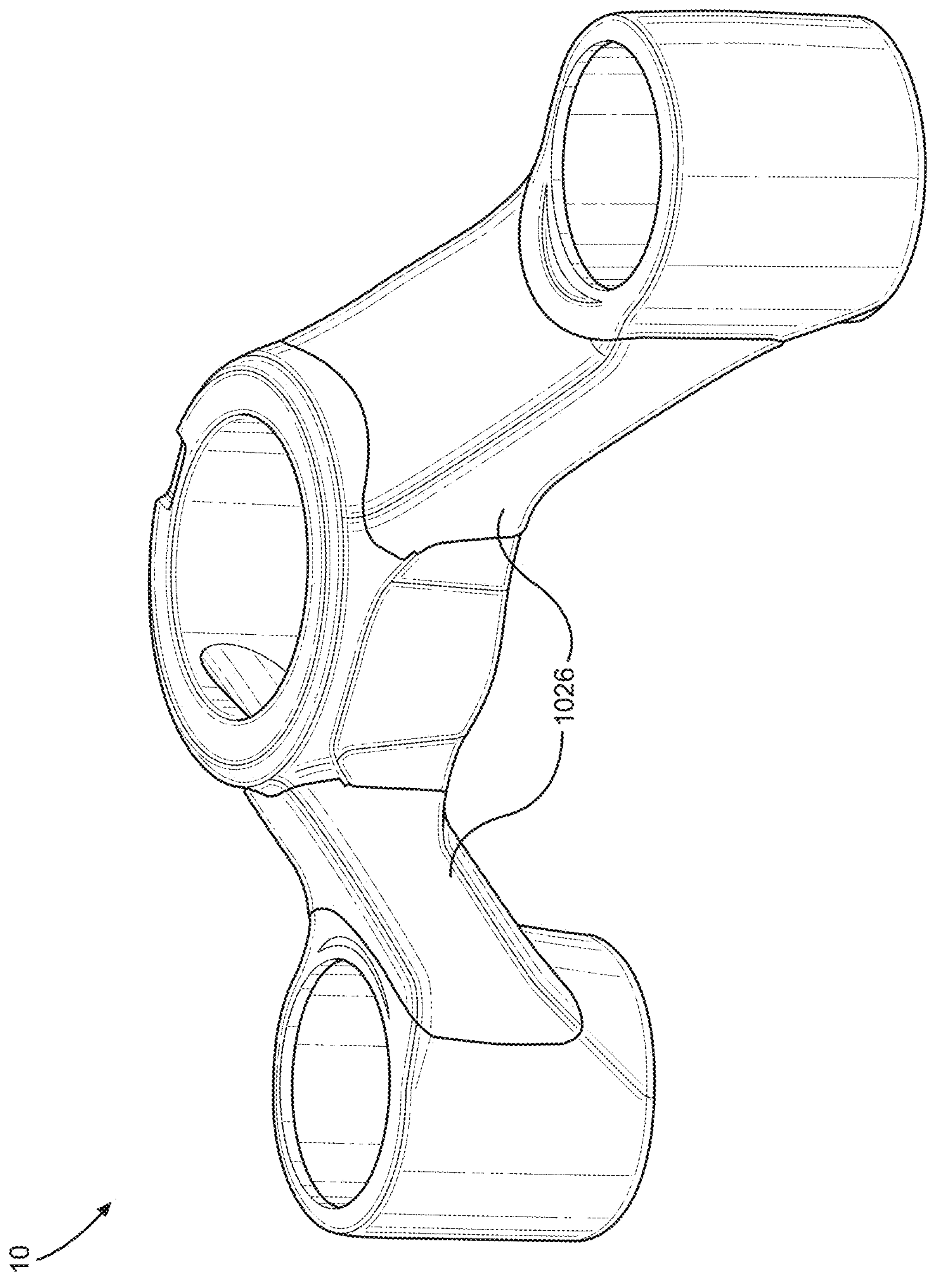
FIG. 24 is a perspective view of crown with arm wrap, according to one embodiment.

FIG. 24 is a perspective view of crown 10 with arm wrap 1026, according to one embodiment.

Figure 25:
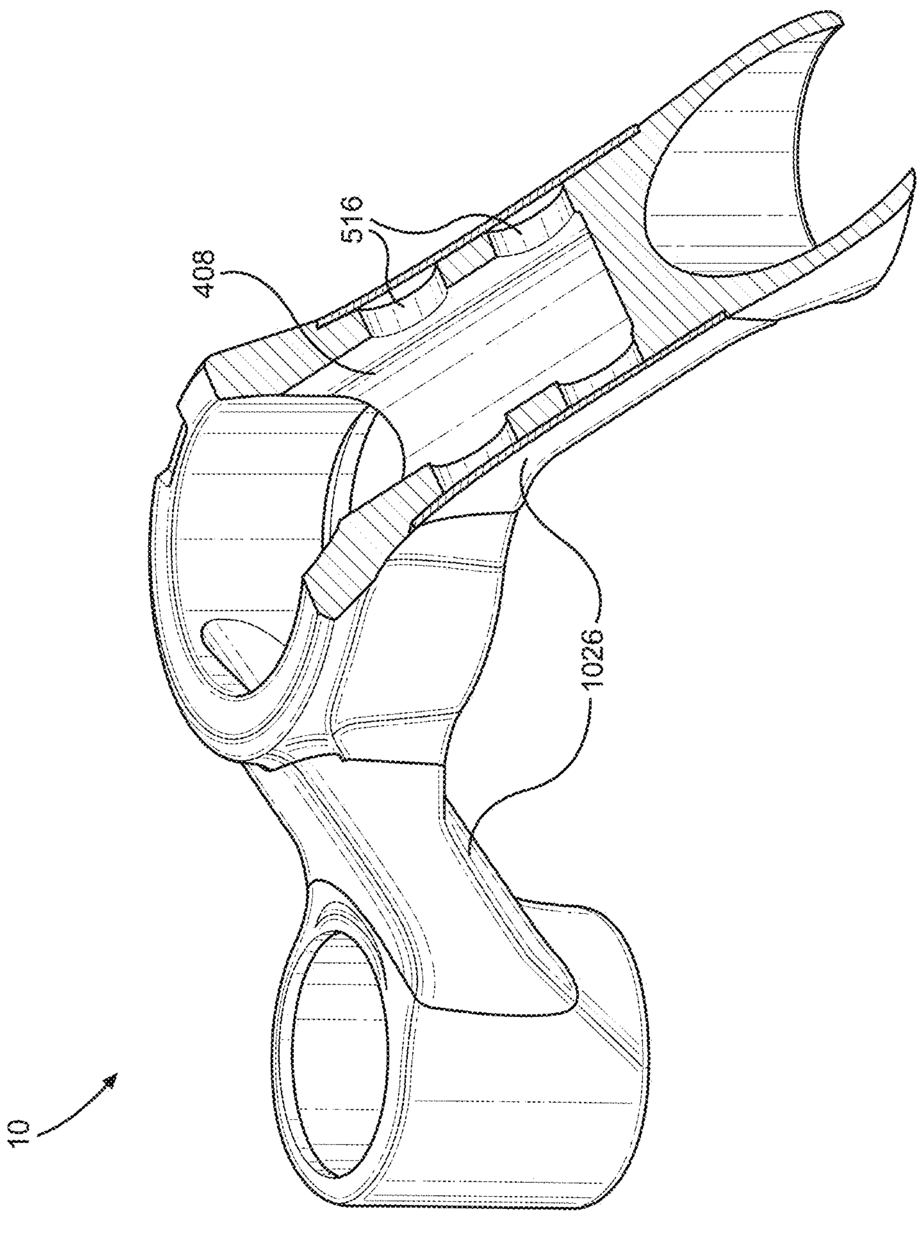
FIG. 25 is a cut away view of crown with arm wrap, according to one embodiment.

FIG. 25 is a cut away view of crown 10 with arm wrap 1026, according to one embodiment.

Similar to plugs 924, arm wrap 1026 offers advantages such as making the component more aesthetically pleasing, more aerodynamic, adding additional strength, and protecting the component from dirt/mud/debris and corrosion by blocking the entrance to bores 516. In one embodiment, arm wrap 1026 is placed on the outer surface of arms 402.

In one embodiment, all bores 516 are blocked by arm wrap 1026. In one embodiment, at least one bore 516 is blocked by arm wrap 1026. In one embodiment, arm wrap 1026 can be placed or removed from crown 10. In one embodiment, arm wrap 1026 is unable to be removed from crown 10.

In one embodiment, arm wrap 1026 is made from the same material as crown 10. In one embodiment, arm wrap 1026 is made from a different material as crown 10. In one embodiment, arm wrap 1026 is flush with the surface of crown 10. In one embodiment, arm wrap 1026 is difficult to distinguish from crown 10 to the average viewer. In one embodiment, arm wrap 1026 is not flush with the surface of crown 10. In one embodiment, arm wrap 1026 is easily distinguishable from crown 10 to the average viewer.

In one embodiment, arm wrap 1026 covers a large portion of arm 402. In one embodiment, arm wrap 1026 covers the portion of arm 402 where bores 516 are present. In one embodiment, arm wrap 1026 covers a portion of bores 516.

Plugs and wraps may similarly be utilized on other restructured components such as, for example, arch 216 or crank arm 16.

Figure 26:
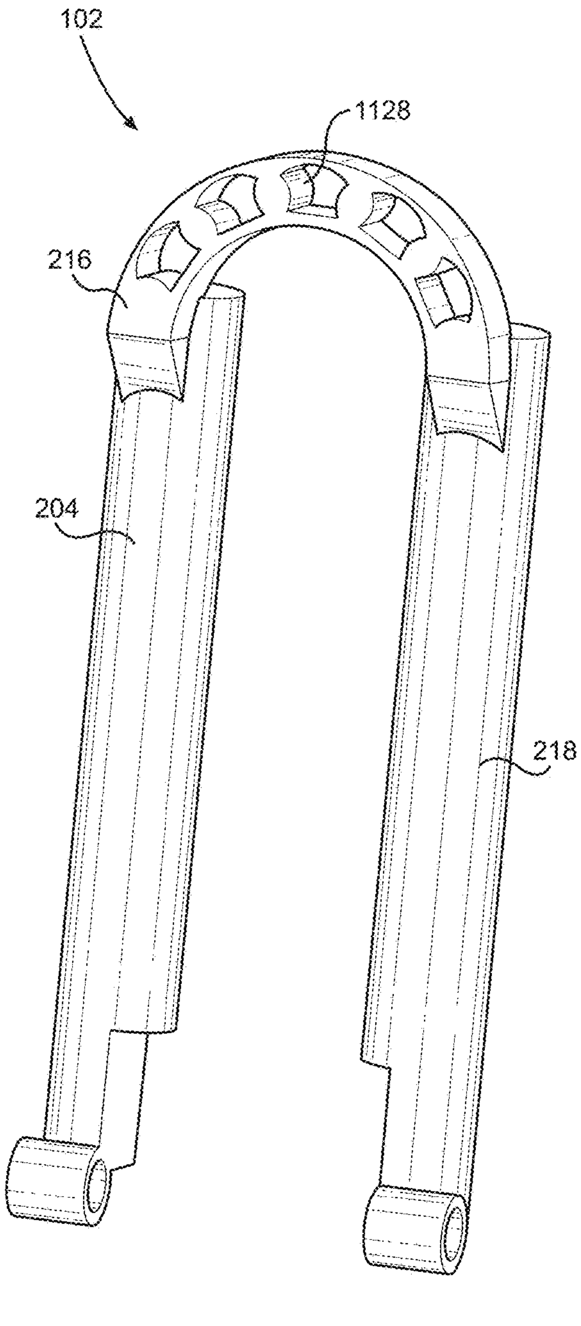
FIG. 26 is a front perspective view of front fork assembly with optimized arch topology, according to one embodiment.

FIG. 26 is a front perspective view of front fork assembly 102 with optimized arch 216 topology, according to one embodiment.

In one embodiment, arch 216 of front fork assembly 102 is restructured in a similar format as described for at least crown 10, to where material is redistributed from parts that bear less load to parts that bear more load. In one embodiment, arch 216 has arch bores 1128. It should be noted that the location and shape of arch bores 1128 is not restricted to that shown in at least FIG. 26. In one embodiment, arch 216 has a captured void, similar to captured void 822. In one embodiment, arch 216 utilizes blind arch bores. In one embodiment, there are supports in at least one arch bore 1128.

Figure 27:
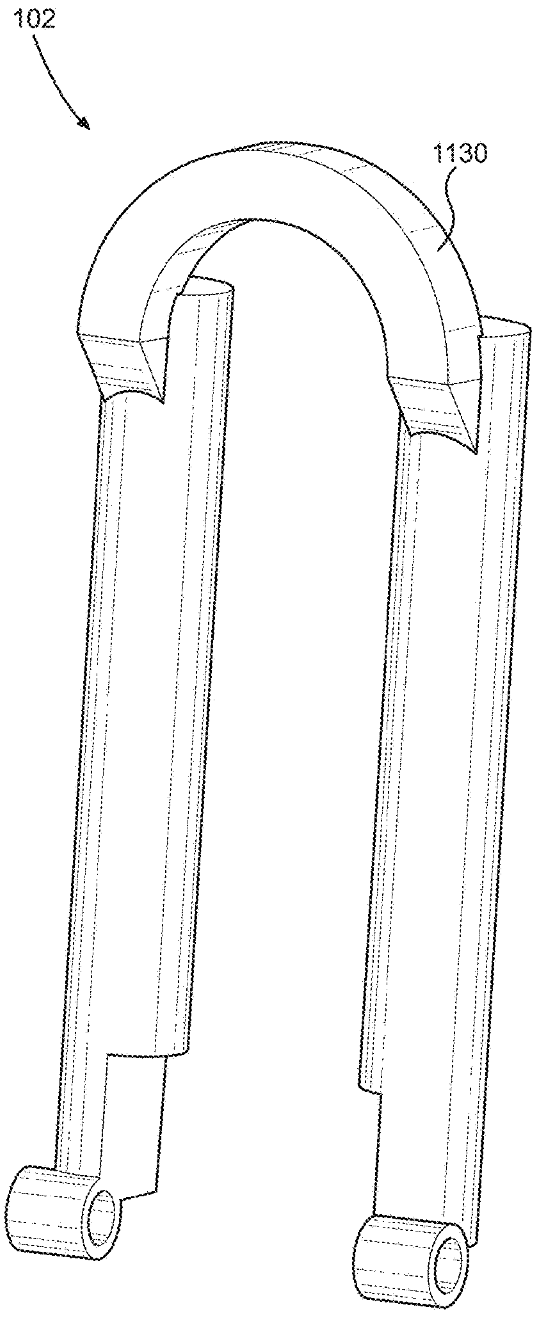
FIG. 27 is a front perspective view of front fork assembly with arch wrap, according to one embodiment.

FIG. 27 is a front perspective view of front fork assembly 102 with arch wrap 1130, according to one embodiment.

In one embodiment, arch wrap 1130 offers advantages such as making the component more aesthetically pleasing, more aerodynamic, adding additional strength, and protecting the component from dirt/mud/debris and corrosion by blocking the entrance to arch bores 1128. In one embodiment, arch wrap 1130 is placed on the outer surface of arch 216.

In one embodiment, all arch bores 1128 are blocked by arch wrap 1130. In one embodiment, at least one arch bores 1128 is blocked by arch wrap 1130. In one embodiment, arch wrap 1130 can be placed or removed from arch 216. In one embodiment, arch wrap 1130 is unable to be removed from arch 216.

In one embodiment, arch wrap 1130 is made from the same material as arch 216. In one embodiment, arch wrap 1130 is made from a different material as arch 216. In one embodiment, arch wrap 1130 is flush with the surface of arch 216. In one embodiment, arch wrap 1130 is difficult to distinguish from arch 216 to the average viewer. In one embodiment, arch wrap 1130 is not flush with the surface of arch 216. In one embodiment, arch wrap 1130 is easily distinguishable from arch 216 to the average viewer.

In one embodiment, arch wrap 1130 covers a large portion of arch 216. In one embodiment, arch wrap 1130 covers the portion of arch 216 where arch bores 1128 are present. In one embodiment, arch wrap 1130 covers a portion of arch bores 1128.

Figure 28:
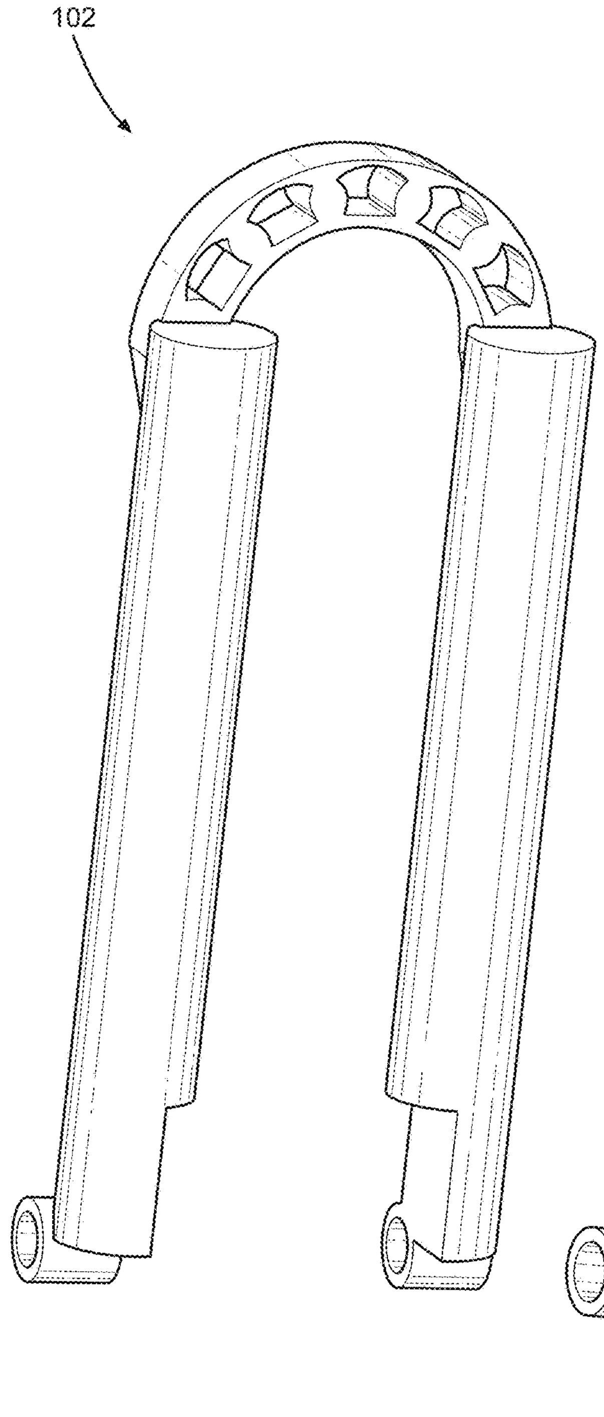
FIG. 28 is a rear perspective view of front fork assembly with optimized arch topology, according to one embodiment.

FIG. 28 is a rear perspective view of front fork assembly 102 with optimized arch 216 topology, according to one embodiment.

Figure 29:
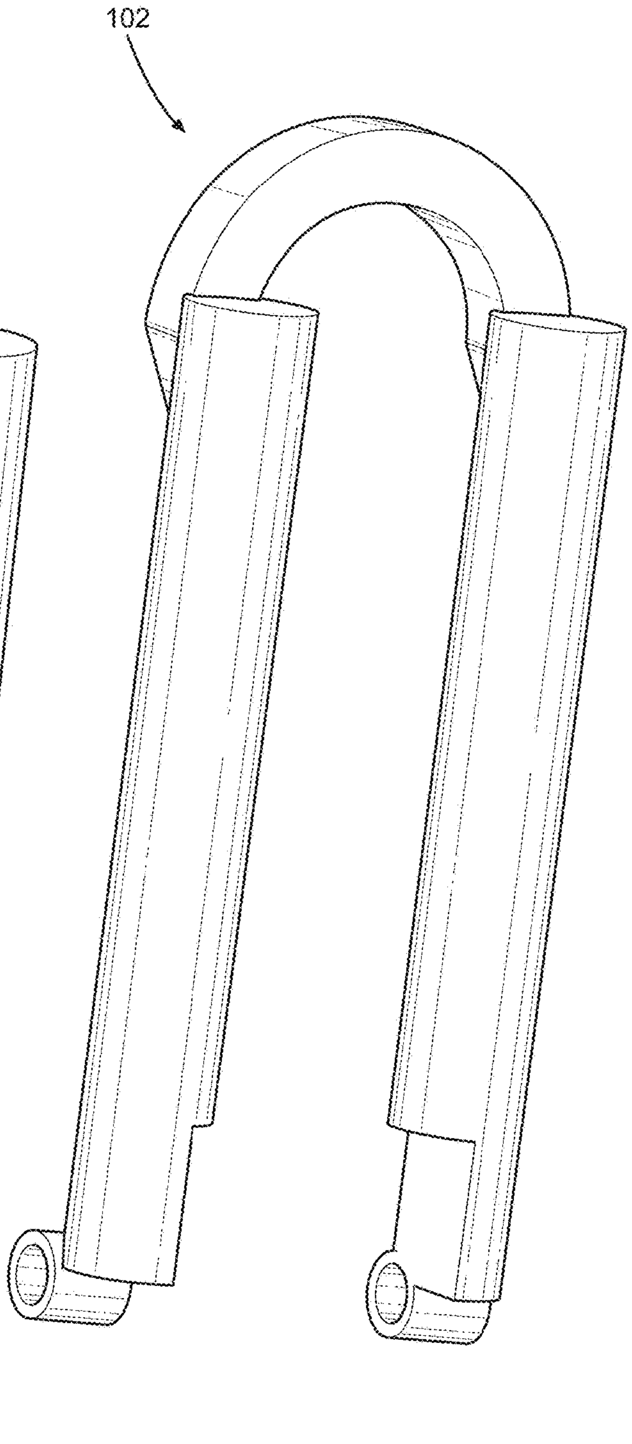
FIG. 29 is a rear perspective view of front fork assembly with arch wrap, according to one embodiment.

FIG. 29 is a rear perspective view of front fork assembly 102 with arch wrap 1130, according to one embodiment.

Figure 30:
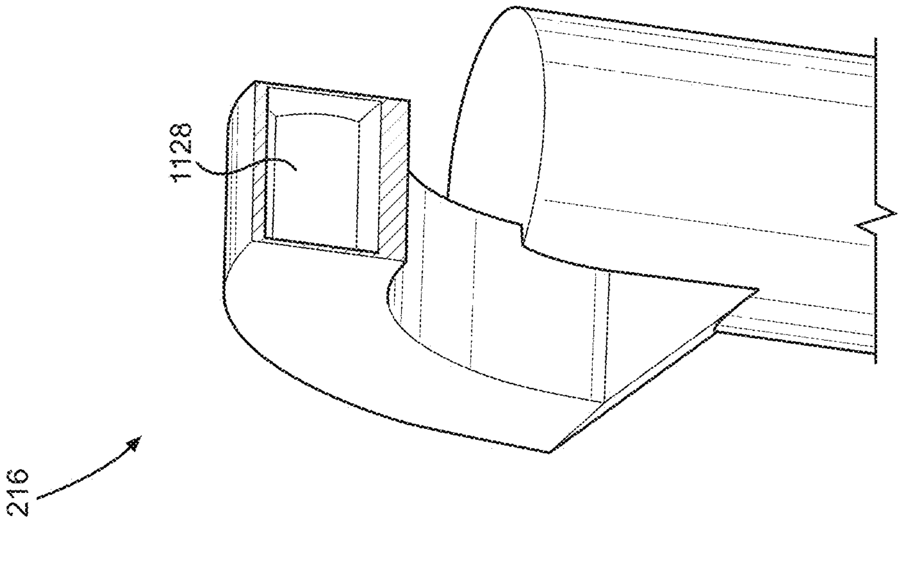
FIG. 30 is a cut away view of arch, according to one embodiment.

FIG. 30 is a cut away view of arch 216, according to one embodiment.

Figure 31:
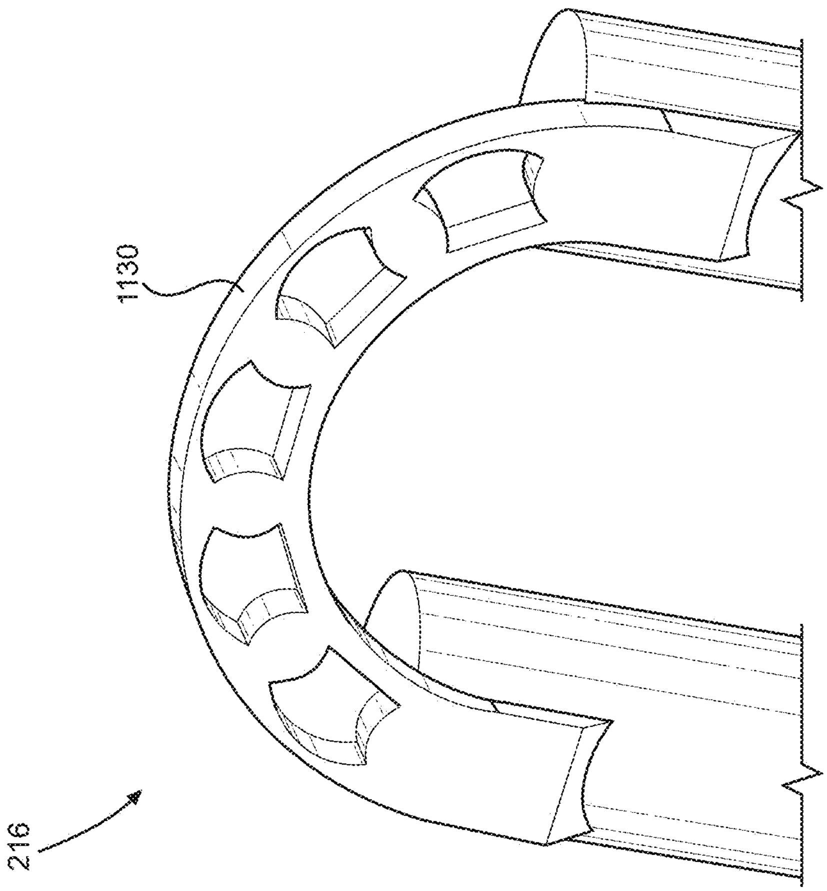
FIG. 31 is a cross section view of arch, according to one embodiment.

FIG. 31 is a cross section view of arch 216, according to one embodiment.

In one embodiment, plugs similar to plugs 924 are used instead of arch wrap 1130.

Figure 32:
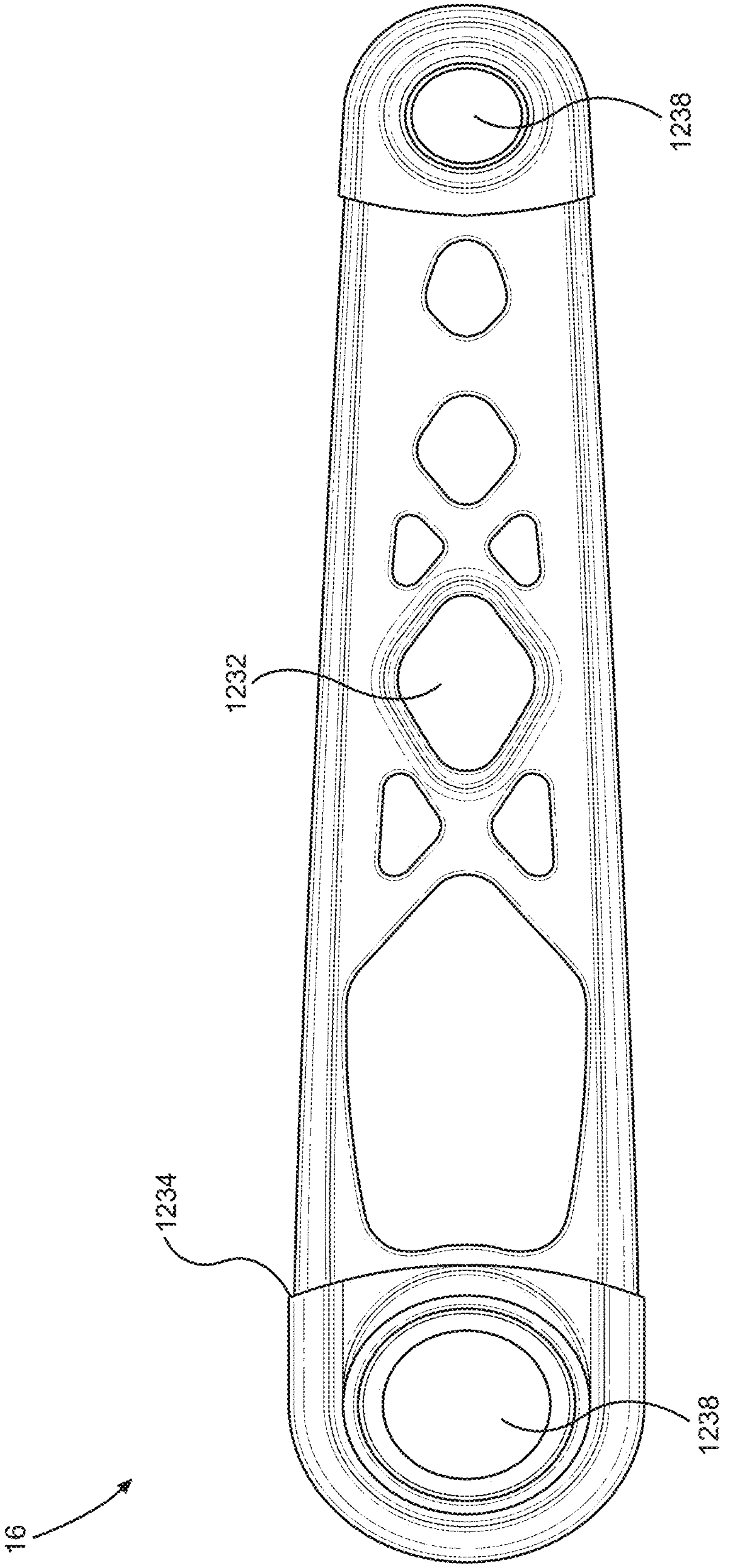
FIG. 32 is a front view of crank arm with optimized topology, according to one embodiment.

FIG. 32 is a front view of crank arm 16 with optimized topology, according to one embodiment. Crank arm 16 has crank bores 1232, ledge 1234, and threaded holes 1238. Threaded holes 1238 are used to attach crank arm 16 to the pedals and axel on bike 50.

In one embodiment, crank arm 16 is restructured in a similar format as described for at least crown 10, to where material is redistributed from parts that bear less load to parts that bear more load. In one embodiment, crank arm 16 has crank bores 1232. It should be noted that the location and shape of crank bores 1232 is not restricted to that shown in at least FIG. 32. In one embodiment, crank arm 16 has a captured void, similar to captured void 822. In one embodiment, crank arm 16 utilizes blind crank bores. In one embodiment, there are supports in at least one crank bore 1232.

Figure 33:
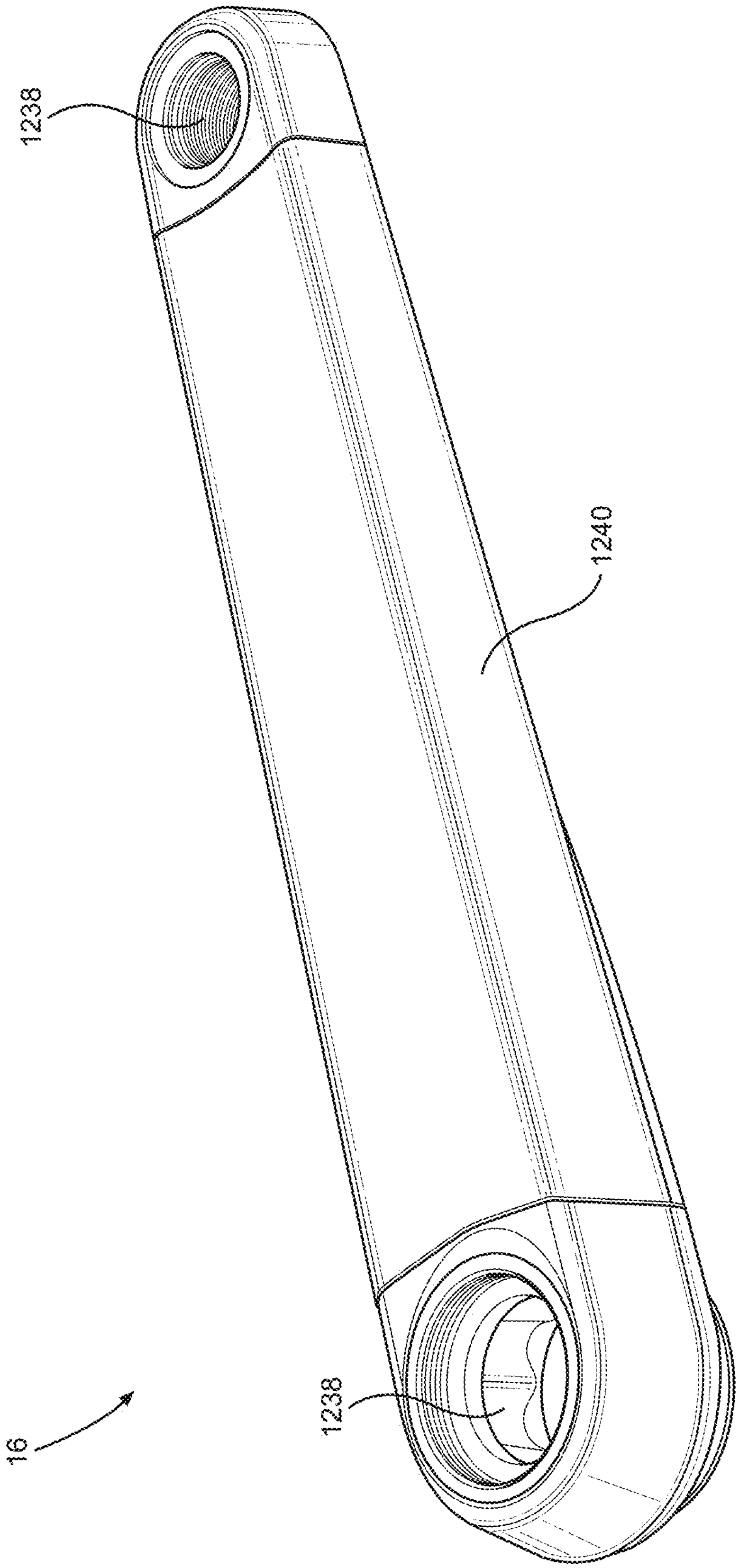
FIG. 33 is a perspective view of crank arm with crank wrap, according to one embodiment.

FIG. 33 is a perspective view of crank arm 16 with crank wrap 1240, according to one embodiment.

Figure 34:
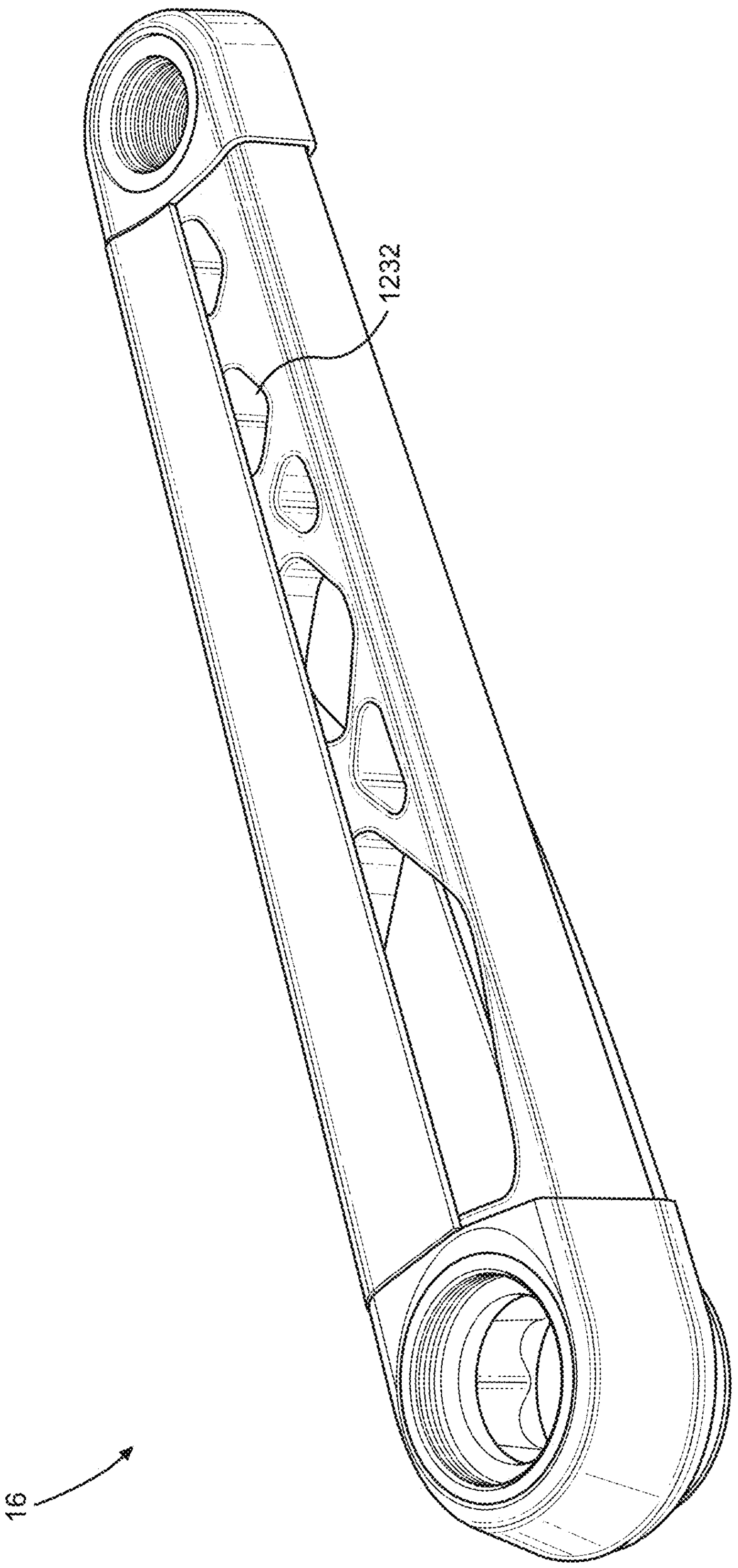
FIG. 34 is a cut away view of crank arm with crank wrap, according to one embodiment.

FIG. 34 is a cut away view of crank arm 16 with crank wrap 1240, according to one embodiment.

In one embodiment, crank wrap 1240 offers advantages such as making the component more aesthetically pleasing, more aerodynamic, adding additional strength, and protecting the component from dirt/mud/debris and corrosion by blocking the entrance to crank bores 1232. In one embodiment, crank wrap 1240 is placed on the outer surface of crank arm 16.

In one embodiment, all crank bores 1232 are blocked by crank wrap 1240. In one embodiment, at least one crank bores 1232 is blocked by crank wrap 1240. In one embodiment, crank wrap 1240 can be placed or removed from crank arm 16. In one embodiment, crank wrap 1240 is unable to be removed from crank arm 16.

In one embodiment, crank wrap 1240 is made from the same material as crank arm 16. In one embodiment, crank wrap 1240 is made from a different material as crank arm 16. In one embodiment, crank wrap 1240 is flush with the surface of crank arm 16. In one embodiment, ledge 1234 allows crank wrap 1240 to be flush with the surface of crank arm 16. In one embodiment, crank wrap 1240 is difficult to distinguish from crank arm 16 to the average viewer. In one embodiment, crank wrap 1240 is not flush with the surface of crank arm 16. In one embodiment, crank wrap 1240 is easily distinguishable from crank arm 16 to the average viewer.

In one embodiment, crank wrap 1240 covers a large portion of crank arm 16. In one embodiment, crank wrap 1240 covers the portion of crank arm 16 where crank bores 1232 are present. In one embodiment, crank wrap 1240 covers a portion of crank bores 1232.

In one embodiment, plugs similar to plugs 924 are used instead of crank wrap 1240.

In one embodiment, plugs (e.g., plugs 924, or plugs for embodiments such as the arch 216 or crank arm 16, collectively referred to as plugs) can comprise materials such metal alloys, for example, aluminum, magnesium, titanium, or the like. In one embodiment, plugs can comprise composite materials, for example, fiber or glass reinforced composites, composites with thermoset or thermoplastic matrix, or similar composites. In one embodiment, plugs can comprise materials such as plastics or elastomers. In one embodiment, the plugs comprise a injection molded thermoplastic rubber.

In one embodiment, wraps (e.g., arm wrap 1026, arch wrap 1130, crank wrap 1240, collectively referred to as wraps) can comprise materials such metal alloys, for example, aluminum, magnesium, titanium, or the like. In one embodiment, wraps can comprise composite materials, for example, fiber or glass reinforced composites, composites with thermoset or thermoplastic matrix, or similar composites. In one embodiment, wraps can comprise materials such as plastics or elastomers.

In one embodiment, wraps and plugs have a logo imprinted or as a boss. Other design features can be added to the exterior of wraps and plugs.

In one embodiment, manufacturing methods for wraps include, but are not limited to, compression molding, bladder molding, a prepreg wrap with a cure cycle, filament winding, wrapping a dry material in a mold and injecting resin, over molding, dip coating, 3D printing, forming multiple pieces that snap to each other or into the component (arm 402, arch 216, crank arm 16, etc.) topology, roller molding, welding sheet metal, etc.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments can be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What we claim is:

1. A crown comprising:

a steerer tube boss;

a first upper tube boss;

a second upper tube boss, wherein the first upper tube boss and the second upper tube boss reside on a plane, wherein the plane comprises the central axis of the first upper tube boss and the central axis of the second upper tube boss, and wherein said plane does not include a central axis of said steerer tube boss;

a first arm to connect the first upper tube boss to the steerer tube boss; and a second arm to connect the second upper tube boss to the steerer tube boss, at least one of the first arm or the second arm comprises at least one bore, wherein said crown is topologically configured to achieve weight, stiffness, and stress thresholds, wherein said crown is topologically configured using a process selected from the group consisting of: an additive process, a subtractive process, and a combination of additive and subtractive processes.

2. The crown of claim 1 wherein, a topology of said first arm and said second arm is restructured to have the same weight and have increased physical characteristics.

3. The crown of claim 1 wherein, a topology of said first arm and said second arm is restructured to be a lighter weight and have physical characteristics within an acceptable range.

4. The crown of claim 1 wherein, a topology of the first arm and the second arm is restructured to be a heavier weight and have increased physical characteristics.

5. The crown of claim 1 wherein, the at least one bore is covered with a material.

6. The crown of claim 5 wherein, the material is different from the material of the crown.

7. The crown of claim 5 wherein, the material is configured as a plug extended into at least a portion of the bore.

8. The crown of claim 5 wherein, the material is configured as a wrap on an outer surface of the first arm and the second arm.

9. A crown comprising:

a steerer tube boss;

a first upper tube boss;

a second upper tube boss, wherein the first upper tube boss and the second upper tube boss reside on a plane, wherein the plane comprises the central axis of the first upper tube boss and the central axis of the second upper tube boss, and wherein said plane does not include a central axis of said steerer tube boss;

a first arm to connect the first upper tube boss to the steerer tube boss; and a second arm to connect the second upper tube boss to the steerer tube boss, at least one of the first arm or the second arm comprises at least one bore, wherein the at least one bore is covered with a material, wherein said crown is topologically configured to achieve weight, stiffness, and stress thresholds, wherein said crown is topologically configured using a process selected from the group consisting of: an additive process, a subtractive process, and a combination of additive and subtractive processes.

10. The crown of claim 9 wherein, a topology of said first arm and said second arm is restructured to have the same weight and have increased physical characteristics.

11. The crown of claim 9 wherein, a topology of said first arm and said second arm is restructured to be a lighter weight and have physical characteristics within an acceptable range.

12. The crown of claim 9 wherein, a topology of the first arm and the second arm is restructured to be a heavier weight and have increased physical characteristics.

13. The crown of claim 9 wherein, the material is different from the material of the crown.

14. The crown of claim 9 wherein, the material is configured as a plug extended into at least a portion of the bore.

15. The crown of claim 9 wherein, the material is configured as a wrap on an outer surface of the first arm and the second arm.

16. A crown comprising:

a steerer tube boss;

a first upper tube boss;

a second upper tube boss, wherein the first upper tube boss and the second upper tube boss reside on a plane, wherein the plane comprises the central axis of the first upper tube boss and the central axis of the second upper tube boss, and wherein said plane does not include a central axis of said steerer tube boss;

a first arm to connect the first upper tube boss to the steerer tube boss; and a second arm to connect the second upper tube boss to the steerer tube boss, at least one of the first arm or the second arm comprises at least one bore, wherein the at least one bore is covered with a material, wherein a topology of said first arm and said second arm is restructured to have the same weight and have increased physical characteristics, wherein said crown is topologically configured to achieve weight, stiffness, and stress thresholds, wherein said crown is topologically configured using a process selected from the group consisting of: an additive process, a subtractive process, and a combination of additive and subtractive processes.

17. The crown of claim 16 wherein, the material is different from the material of the crown.

18. The crown of claim 16 wherein, the material is configured as a plug extended into at least a portion of the bore.

19. The crown of claim 16 wherein, the material is configured as a wrap on an outer surface of the first arm and the second arm.

* * * * *